United States Patent
Hamada et al.

(10) Patent No.: US 11,403,935 B2
(45) Date of Patent: Aug. 2, 2022

(54) MOBILE TERMINAL

(71) Applicant: JVCKENWOOD Corporation, Yokohama (JP)

(72) Inventors: Aki Hamada, Yokohama (JP); Masaki Takei, Yokohama (JP); Toru Kaiwa, Yokohama (JP); Hiromitsu Asaka, Yokohama (JP); Misa Suzuki, Yokohama (JP); Masashi Uemoto, Yokohama (JP); Miharu Kobayashi, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 17/202,503

(22) Filed: Mar. 16, 2021

(65) Prior Publication Data

US 2022/0020260 A1 Jan. 20, 2022

Related U.S. Application Data

(63) Continuation of application No. PCT/JP2020/028044, filed on Jul. 20, 2020.

(30) Foreign Application Priority Data

Sep. 20, 2019 (JP) .............................. JP2019-172131

(51) Int. Cl.
*G08B 21/22* (2006.01)
*G08B 7/06* (2006.01)
*H04R 1/10* (2006.01)

(52) U.S. Cl.
CPC ............... *G08B 21/22* (2013.01); *G08B 7/06* (2013.01); *H04R 1/1008* (2013.01)

(58) Field of Classification Search
CPC .......... G08B 21/22; G08B 7/06; G08B 13/00; G08B 13/24; G08B 21/02; H04R 1/1008; H04R 2420/07; H04R 2430/01; H04R 5/033; H04R 5/04; H04R 1/1091; H04R 1/1041; H04M 1/00
See application file for complete search history.

(56) References Cited

U.S. PATENT DOCUMENTS 10,380,875 B1 * 8/2019 Roberts .................... G08B 7/06
2007/0189544 A1 * 8/2007 Rosenberg ............... H03G 3/32
381/104

(Continued)

FOREIGN PATENT DOCUMENTS

JP 2018-60403 A 4/2018

*Primary Examiner* — Brian Wilson
(74) *Attorney, Agent, or Firm* — Nath, Goldberg & Meyer; Jerald L. Meyer

(57) ABSTRACT

A communication circuit communicates with a right earphone worn on a right ear of a user and a left earphone worn on a left ear of the user to receive a first output signal generated by a first motion sensor provided in the right earphone and a second output signal generated by a second motion sensor provided in the left earphone. A detector detects whether a third party has approached the user based on a difference value between the first output signal and the second output signal received by the communication circuit. A notification unit notifies the user that the third party has approached the user when the detector detects that the third party has approached the user.

19 Claims, 20 Drawing Sheets

(56) References Cited

U.S. PATENT DOCUMENTS

| | | | | |
|---|---|---|---|---|
| 2010/0306711 A1* | 12/2010 | Kahn | .................. | H04M 1/6058 |
| | | | | 715/863 |
| 2017/0188129 A1* | 6/2017 | Sindia | .................. | H03G 3/3005 |
| 2017/0359467 A1* | 12/2017 | Norris | .................. | G10L 21/028 |
| 2018/0190090 A1* | 7/2018 | Ardo | ....................... | G06F 3/013 |
| 2020/0267468 A1* | 8/2020 | Smith | ...................... | H04N 5/33 |

* cited by examiner

FIG. 9
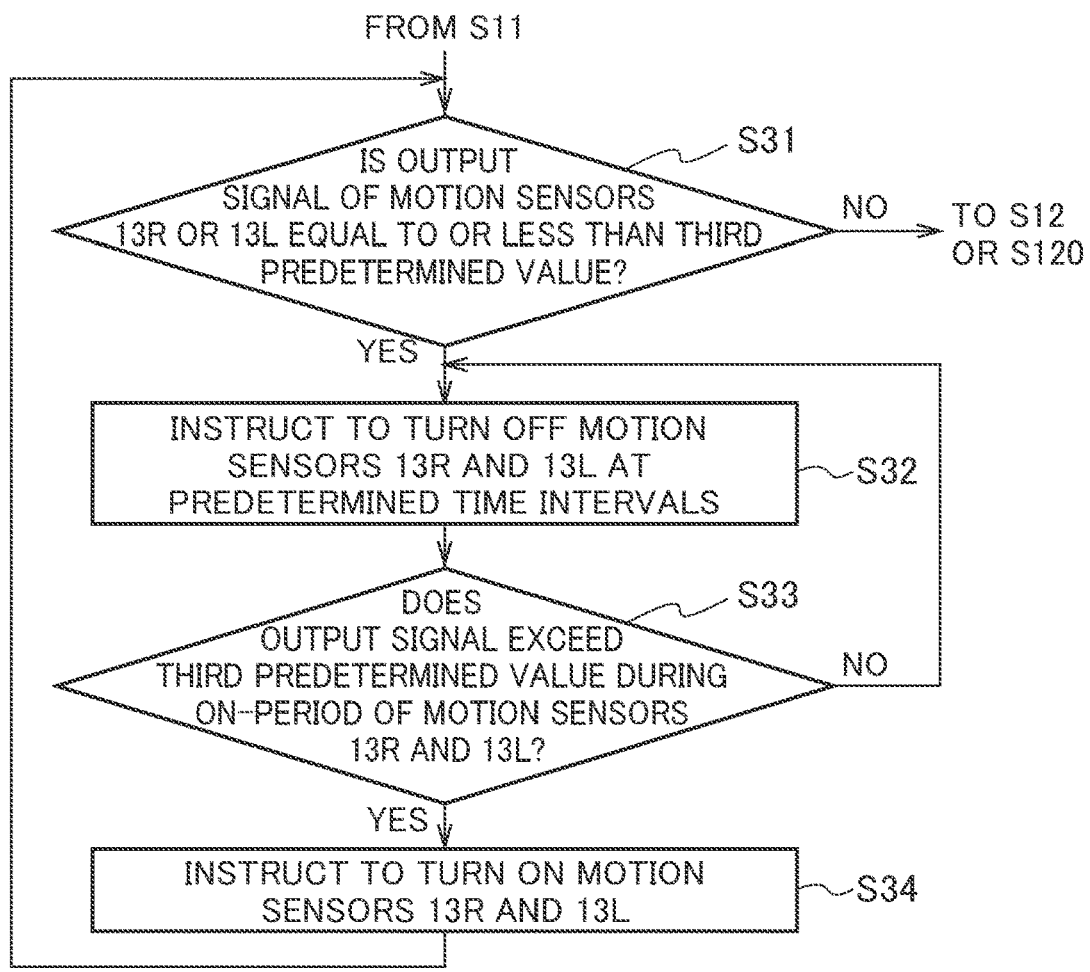
FIG. 10
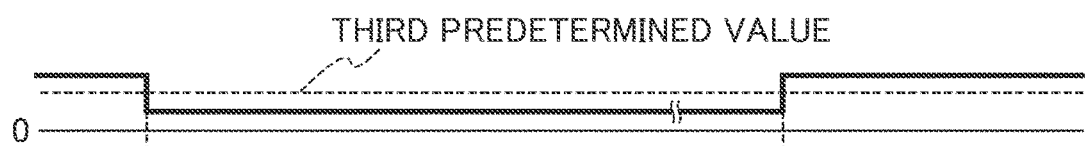
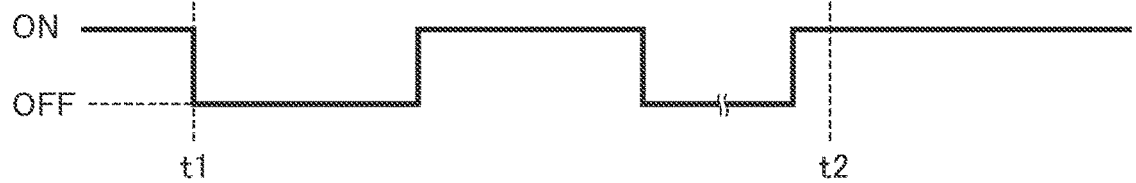

MOBILE TERMINAL

CROSS REFERENCE TO RELATED APPLICATION

This application is a Continuation of PCT Application No. PCT/JP2020/028044, filed on Jul. 20, 2020, and claims the priority of Japanese Patent Application No. 2019-172113, filed on Sep. 20, 2019, Japanese Patent Application No. 2019-172117, filed on Sep. 20, 2019, Japanese Patent Application No. 2019-172120, filed on Sep. 20, 2019, Japanese Patent Application No. 2019-172122, filed on Sep. 20, 2019, Japanese Patent Application No. 2019-172129, filed on Sep. 20, 2019, Japanese Patent Application No. 2019-172131, filed on Sep. 20, 2019, and Japanese Patent Application No. 2019-172134, filed on Sep. 20, 2019, the entire contents of all of which are incorporated herein by reference.

BACKGROUND

The present disclosure relates to a mobile terminal that communicates with an earphone equipped with a motion sensor.

Japanese Unexamined Patent Application Publication No. 2018-60403 describes a technology that detects a person approaching a user wearing an earphone and informs the user of it.

SUMMARY

There is a demand for a mobile terminal capable of accurately detecting and notifying of a third party who is approaching a user and should be notified to the user.

An aspect of one or more embodiments provides a mobile terminal including: a communication circuit configured to communicate with a right earphone worn on a right ear of a user and a left earphone worn on a left ear of the user to receive a first output signal generated by a first motion sensor provided in the right earphone and a second output signal generated by a second motion sensor provided in the left earphone; a detector configured to detect whether a third party has approached the user based on a difference value between the first output signal and the second output signal received by the communication circuit; and a notification unit configured to notify the user that the third party has approached the user when the detector detects that the third party has approached the user.

BRIEF DESCRIPTION OF THE DRAWINGS

FIG. 9 is a flowchart illustrating a first example of a process executed in the mobile terminal according to a third embodiment.

FIG. 10 is a timing chart illustrating a first example of the process executed in the mobile terminal according to a third embodiment.

DETAILED DESCRIPTION

Figure 1:
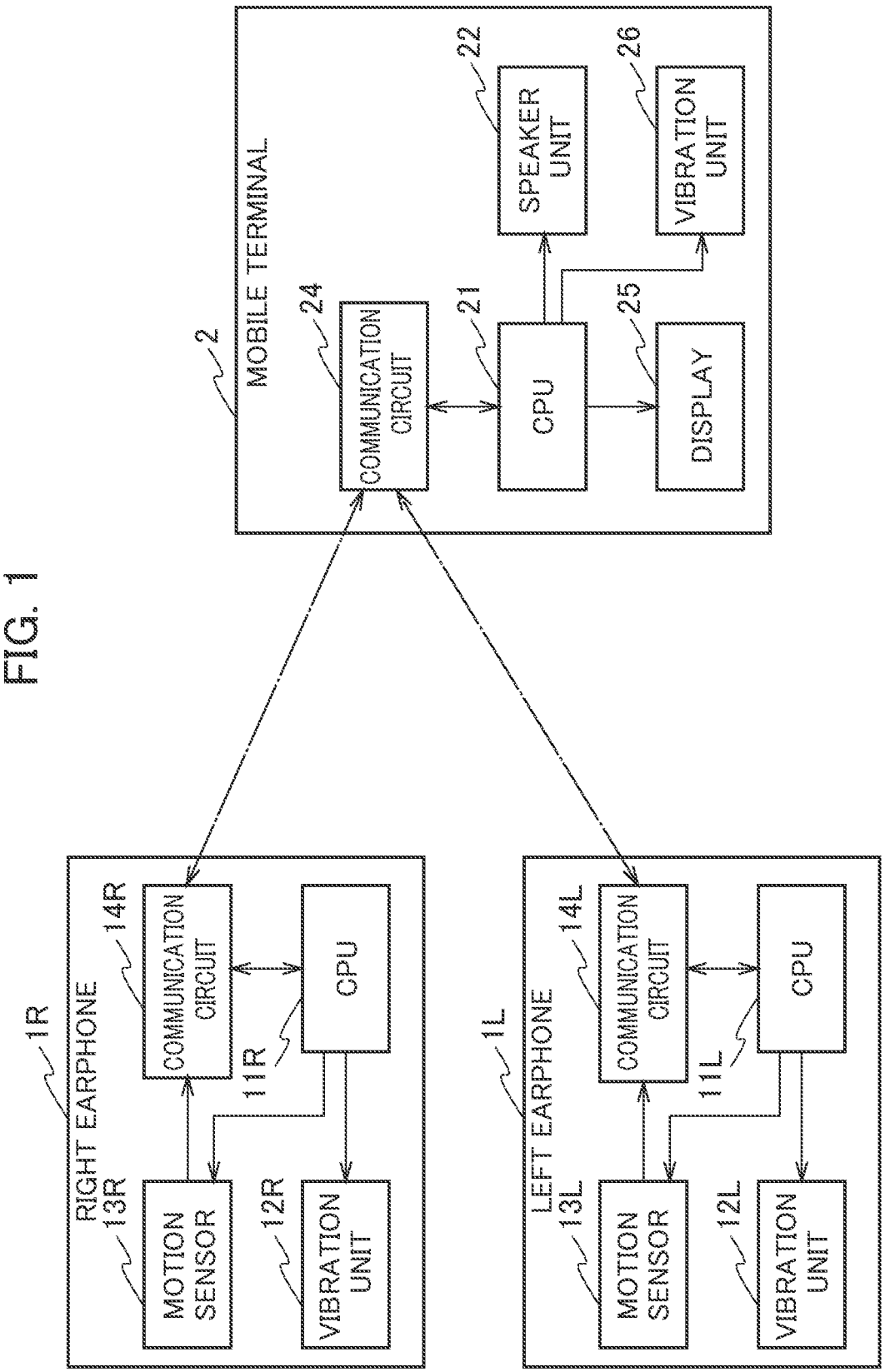
FIG. 1 is a block diagram illustrating a mobile terminal according to a first embodiment.

Hereinafter, mobile terminals according to first to seventh embodiments will be described with reference to the accompanying drawings. In the mobile terminals according to first to seventh embodiments, the same parts may be denoted by the same reference numerals and the description thereof may be omitted.

First Embodiment

Figure 2:
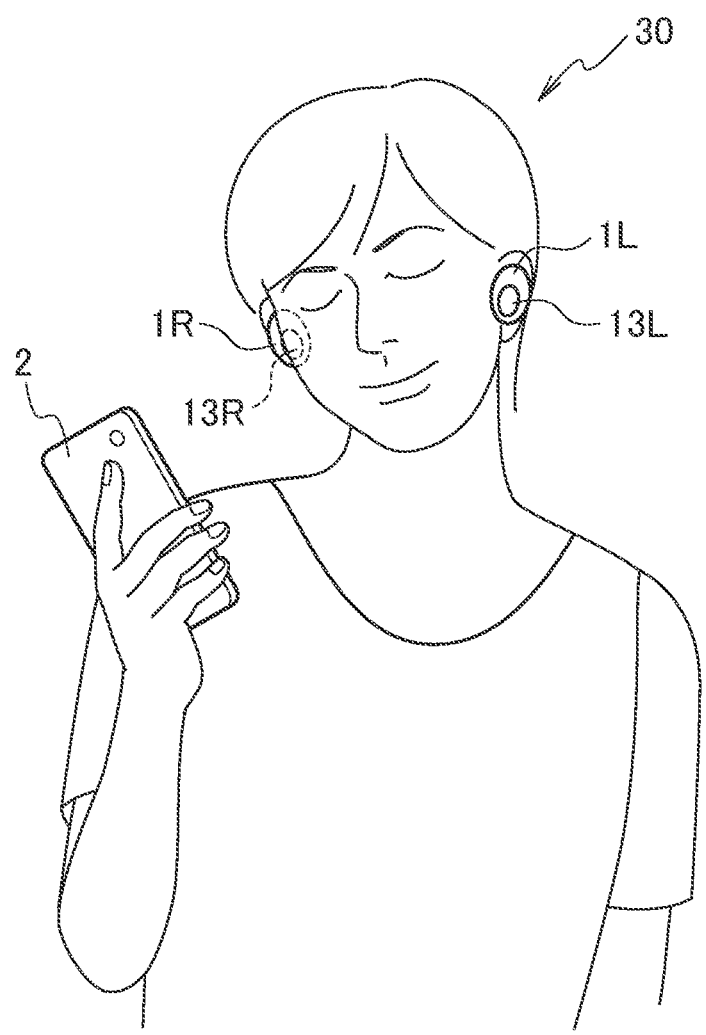
FIG. 2 is a conceptual diagram illustrating a user wearing right and left earphones and holding a mobile terminal according to first to seventh embodiments.

As shown in FIG. 2, a user 30 is wearing a right earphone 1R and a left earphone 1L on a right ear and a left ear, respectively. The right earphone 1R and the left earphone 1L include motion sensors 13R and 13L, respectively. The user 30 has a mobile terminal 2 that communicates with the right earphone 1R and the left earphone 1L. The mobile terminal 2 may be a smartphone.

As shown in FIG. 1, the right earphone 1R includes, in addition to the motion sensor 13R, a central processing unit (CPU) 11R, a vibration unit 12R, and a communication circuit 14R. The left earphone 1L includes, in addition to the motion sensor 13L, a CPU 11L, a vibration unit 12L, and a communication circuit 14L. The mobile terminal 2 includes a CPU 21, a speaker unit 22, a communication circuit 24, a display 25, and a vibration unit 26.

The motion sensors 13R and 13L detect whether a person is in the vicinity by measuring far infrared rays or peripheral potentials. The vibration units 12R and 12L may be a speaker unit including a diaphragm and a magnetic circuit for driving the diaphragm, or may be a bone conduction unit including a bone conduction device. The communication circuits 14R and 14L communicate with the communication circuit 24 of the mobile terminal 2 according to any short-range radio communication standard such as Bluetooth (registered trademark).

The mobile terminal 2 may include a memory for storing music files, and may reproduce the music files and transmit audio data of the music files to the right earphone 1R and the left earphone 1L by the communication circuit 24. The vibration unit 26 is a so-called vibrator that transmits vibration to the user 30.

When the motion sensor 13R detects a person, the communication circuit 14R transmits an output signal of the motion sensor 13R to the mobile terminal 2. When the motion sensor 13L detects a person, the communication circuit 14L transmits the output signal of the motion sensor 13R to the mobile terminal 2. In principle, the CPU 21 can detect that a person has approached the user 30 based on the output signal of the motion sensor 13R or 13L received by the communication circuit 24.

However, in reality, since the motion sensors 13R and 13L measure far infrared rays and the like emitted by the user 30 wearing the right earphone 1R and the left earphone 1L, the motion sensors 13R and 13L generate a predetermined output signal even when a third party has not approached. Accordingly, it may not be possible to accurately detect a third party who is approaching the user 30 and should be notified to the user 30.

Therefore, the CPU 21 subtracts the output signal of the motion sensor 13R and the output signal of the motion sensor 13L that is received by the communication circuit 24 from each other. When the communication circuit 24 receives the output signals of the motion sensors 13R and 13L while there is no third party around the user 30, when the CPU 21 subtracts the output signals of both from each other, it is almost 0. That is, when the CPU 21 subtracts the output signals of the motion sensors 13R and 13L from each other, the output signal generated by detecting the user 30 can be removed. Here, it is considered that the output signal of the motion sensor 13R and the output signal of the motion sensor 13L have substantially the same signal strength.

When a third party approaches the user 30, the motion sensor 13R or 13L or both of the motion sensors 13R and 13L measure, in addition to the far infrared rays and the like emitted by the user 30, the far infrared rays and the like emitted by the third party to generate an output signal. The CPU 21 subtracts the output signal of the motion sensor 13R and the output signal of the motion sensor 13L received by the communication circuit 24 from each other to generate a difference value. Since the output signal generated by detecting the user 30 as described above is removed, when the difference value is equal to or greater than a predetermined value, the CPU 21 can determine that a third party has approached the user 30.

When the difference value is equal to or greater than the predetermined value, the CPU 21 transmits a predetermined voice signal to the right earphone 1R and the left earphone 1L in order to notify the user 30 that a person has approached. The CPU 21 may cause the speaker unit 22 to generate sound, cause the display 25 to display characters or images indicating that a person has approached, or cause the vibration unit 26 to vibrate.

The CPU 21 subtracts the output signal of the motion sensor 13L from the output signal of the motion sensor 13R, and when the difference value is positive and equal to or greater than the predetermined value, it can be seen that the third party is approaching the user 30 from the right. When the difference value is negative and equal to or less than the predetermined value (the absolute value of the difference value is equal to or greater than the predetermined value), it can be seen that the third party is approaching the user 30 from the left. The CPU 21 may transmit a voice signal to the right earphone 1R or the left earphone 1L in the direction in which the third party is approaching. From the ratio of the signal strength of the output signal of the motion sensor 13R and the output signal of the motion sensor 13L, the direction in which the third party is approaching can be known. The CPU 21 may notify the user 30 of the direction.

The process executed by the mobile terminal 2 will be described with reference to the flowchart shown in FIG. 3. When an illustrated power supply of the mobile terminal 2 is turned on and the mobile terminal 2 starts operating, the CPU 21 acquires the output signals of the motion sensors 13R and 13L in step S11. In step S12, the CPU 21 subtracts the output signal of the motion sensor 13L from the output signal of the motion sensor 13R to generate a difference value. As a result, the signal components of sensing the user 30 by the motion sensors 13R and 13L are substantially removed. The CPU 21 may subtract the output signal of the motion sensor 13R from the output signal of the motion sensor 13L.

In step S13, the CPU 21 determines whether a third party is approaching based on the difference value obtained by subtracting the output signal of the motion sensor 13L from the output signal of the motion sensor 13R. When the absolute value of the difference value is equal to or greater than the predetermined value, the CPU 21 determines that a third party has approached. When no third party has approached (NO), the CPU 21 moves the process to step S15. When a third party has approached (YES), the CPU 21 notifies the user 30 in step S14 by any of the methods described above, and moves the process to step S15.

In step S15, the CPU 21 determines whether the power of the mobile terminal 2 is turned off. When the power is not turned off (NO), the CPU 21 repeats the processes of steps S11 to S15, and when the power is turned off (YES), the CPU 21 ends the process. The notification to the user 30 in step S14 may be stopped when the user 30 performs an operation to stop the notification, or may be automatically stopped after a predetermined period of time.

Meanwhile, as a method of removing the output signal generated by the motion sensors 13R and 13L detecting the user 30, the following method may be considered. The storage unit stores the output signals of the motion sensors 13R and 13L, which are the output signals of when there is no third party approaching the user 30, as right and left basic output signals. When a third party has approached the user 30, the CPU 21 subtracts the right basic output signal from the output signal of the motion sensor 13R and subtracts the left basic output signal from the output signal of the motion sensor 13L.

In such a method, when the motion sensors 13R and 13L employ a method of detecting heat with far infrared rays, when the body temperature rises due to exercises by the user 30, for example, the rise in body temperature becomes a noise. Even though the third party has not actually approached the user 30, it may be erroneously detected that the third party has approached. According to the method of subtracting the output signal of the motion sensor 13R and the output signal of the motion sensor 13L from each other described above, it is possible to detect the approach of the third party with less false detection and high accuracy.

According to the method of subtracting the output signal of the motion sensor 13R and the output signal of the motion sensor 13L from each other, when the third party approaches while moving on an equidistant line from the motion sensor 13R and the motion sensor 13L in front of or directly behind the user 30, the approach of the third party cannot be detected. However, since it is extremely rare for a third party to approach the user 30 as such, it does not substantially matter.

If the sensitivity of the motion sensor 13R and the sensitivity of the motion sensor 13L are different from each other or the temperatures of the left and right ears of the user 30 are different from each other, when a third party has not approached the user 30, the output signal of the motion sensor 13R and the output signal of the motion sensor 13L may not have substantially the same signal strength. If the output signal of the motion sensor 13R and the output signal of the motion sensor 13L are different from each other, it is preferable to match the signal strengths of the two by multiplying a weighting coefficient.

A preferred process executed by the mobile terminal 2 including the process of matching the signal strengths of the output signal of the motion sensor 13R and the output signal of the motion sensor 13L, will be described with reference to the flowchart shown in FIG. 4.

In step S01, the CPU 21 acquires the output signals of the motion sensors 13R and 13L. In step S02, the CPU 21 multiplies the output signals of the motion sensors 13R and 13L by a predetermined weighting coefficient to weight them. In step S03, the CPU 21 subtracts the output signal of the weighted motion sensor 13L from the output signal of the weighted motion sensor 13R to generate a difference value. In step S04, the CPU 21 determines whether the difference value is equal to or less than a first predetermined value. The first predetermined value is set to a small value.

When the difference value is not equal to or less than the first predetermined value in step S04 (NO), the CPU 21 changes the weighting coefficient S05 and repeats the processes of steps S01 to S05. The processes of steps S01 to S05 are executed when there is no third party around the user 30. By repeating the processes of steps S01 to S05, a weighting coefficient can be obtained, with which the difference value is equal to or less than the first predetermined value.

When the difference value is equal to or less than the first predetermined value in step S04, the CPU 21 determines the weighting coefficient for the output signals of the motion sensors 13R and 13L in step S06. The weighting coefficient for the output signal of one of the motion sensors 13R and 13L may be 1. The initial setting for determining the weighting coefficient is completed by the processes of S01 to S06.

In step S11, the CPU 21 acquires the output signals of the motion sensors 13R and 13L. In step S120, the CPU 21 weights with the determined weighting coefficient, subtracts the output signal of the motion sensor 13L from the output signal of the motion sensor 13R to generate a difference value, and moves the process to S13. The processes of S13 to 15 are the same as those in FIG. 3.

In the example shown in FIG. 4, the weighting coefficient is gradually changed to determine the weighting coefficient with which the difference value is equal to or less than the first predetermined value, but the weighting coefficient may be determined as follows. It is assumed that the output signal of the motion sensor 13R is S1, and the output signal of the motion sensor 13L is S2. It is assumed that the weighting coefficients for the output signals S1 and S2 are $\alpha 1$ and $\alpha 2$. The difference value is $\alpha 1 \times S1 - \alpha 2 \times S2$. When the weighting coefficient $\alpha 1$ is 1 and the weighting coefficient $\alpha 2$ is $S1/S2$, the difference value may be 0. Since the weighting coefficients $\alpha 1$ and $\alpha 2$ vary for each user 30, the coefficients are set individually for each user 30.

As described above, in the mobile terminal 2 according to a first embodiment, the communication circuit 24 communicates with the right earphone 1R worn on the right ear of the user 30 and the left earphone 1L worn on the left ear of the user 30. The communication circuit 24 receives the first output signal generated by the motion sensor 13R (first motion sensor) provided in the right earphone 1R and the second output signal generated by the motion sensor 13L (second motion sensor) provided in the left earphone 1L.

The CPU 21 serves as a detector, and detects whether a third party has approached the user 30 based on the difference value between the first output signal and the second output signal received by the communication circuit 24. When the CPU 21 detects that a third party has approached the user 30, the notification unit described below notifies the user 30 that a third party has approached.

When no third party has approached the user 30, the CPU 21 preferably multiplies the first output signal and the second output signal by the weighting coefficient such that the difference value between the first output signal and the second output signal is equal to or less than the first predetermined value.

The communication circuit 24 serves as a notification unit, and the communication circuit 24 transmits a voice signal notifying the user 30 that a third party has approached to at least one of the right earphone 1R and the left earphone 1L. When a third party is approaching the user from the right direction, the voice signal may be transmitted to the right earphone 1R, and when the third party is approaching the user 30 from the left direction, the voice signal may be transmitted to the left earphone 1L. A stereo voice signal may be transmitted to the right earphone 1R and the left earphone 1L, such that the user 30 hears the sound from a direction in which the third party is approaching the user 30, corresponding to the direction.

As a notification unit, the speaker unit 22 may generate a voice notifying the user 30 that a third party has approached. As a notification unit, the display 25 may display characters or images notifying the user 30 that a third party has approached. As a notification unit, the vibration unit 26 may notify the user 30 by vibration that a third party has approached.

In accordance with the mobile terminal 2 according to a first embodiment, since the motion sensors 13R and 13L remove the output signal generated by detecting the user 30, it is possible to accurately detect and notify of a third party who is approaching the user and should be notified to the user.

Second Embodiment

In the mobile terminal 2 according to a first embodiment, the user 30 is notified of the approach of a third party even when there are a plurality of people around the user 30. The mobile terminal 2 according to a second embodiment is configured to not notify the user 30 of the approach of a third party when there are a plurality of people around the user 30.

Figure 5:
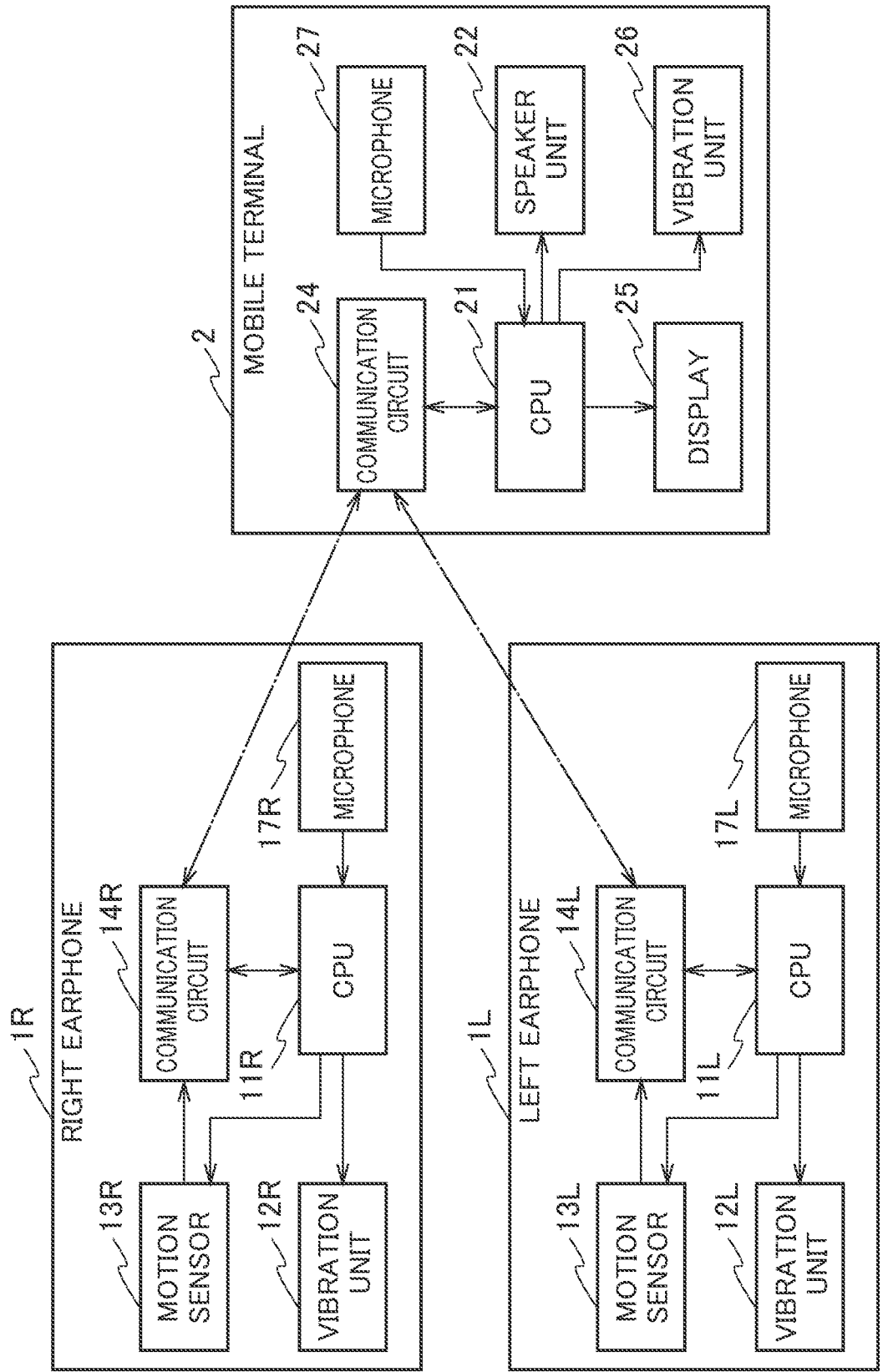
FIG. 5 is a block diagram illustrating a mobile terminal according to a second embodiment.

In FIG. 5, the right earphone 1R includes a microphone 17R, and the left earphone 1L includes a microphone 17L. The mobile terminal 2 includes a microphone 27. The microphones 17R, 17L, and 27 may be noise canceling microphones. Only the mobile terminal 2 may include the microphone 27, and the right earphone 1R and the left earphone 1L may not include the microphones 17R and 17L. Only the right earphone 1R and the left earphone 1L may include the microphones 17R and 17L, and the mobile terminal 2 may not include the microphone 27.

The microphones 17R and 17L transmit the voice signal picked up by the microphones 17R and 17L to the mobile terminal 2. The right earphone 1R and the left earphone 1L may transmit a volume to the mobile terminal 2 based on the voice signals picked up by the microphones 17R and 17L.

Figure 6:
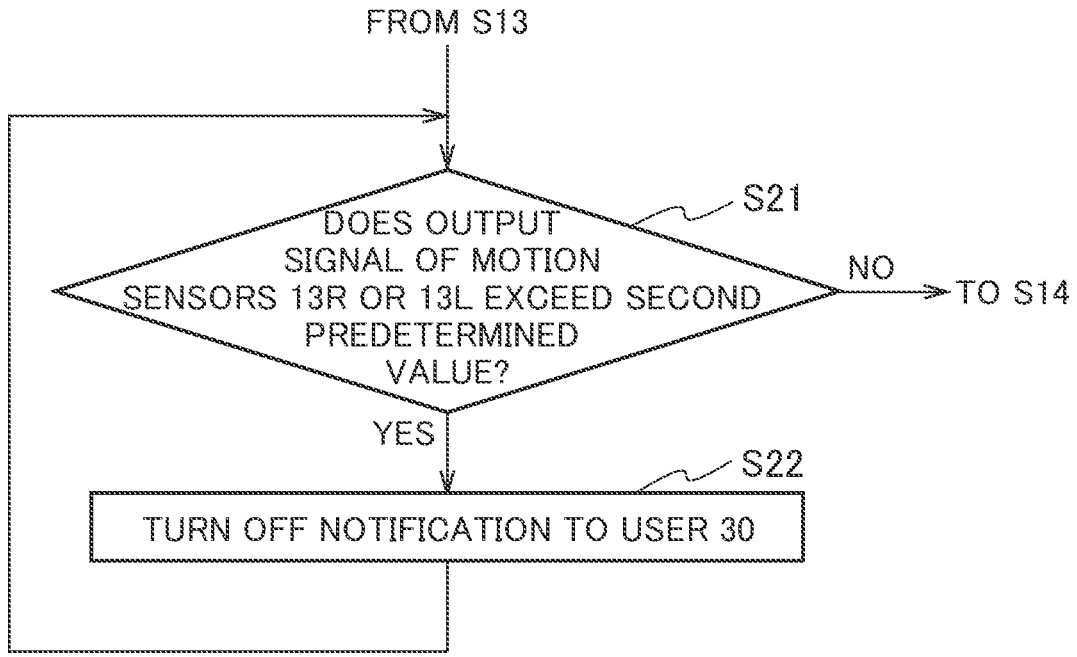
FIG. 6 is a flowchart illustrating a first example of a process executed in the mobile terminal according to a second embodiment.

With reference to the flowchart shown in FIG. 6, a first example executed by the mobile terminal 2 will be described, in which it is processed to not notify of the approach of a third party in a situation in which there are a plurality of people around the user 30. Steps S21 and S22 shown in FIG. 6 are provided between steps S13 and S14 of FIG. 3 or 4. When the approach of a third party is detected in step S13 of FIG. 3 or 4, in step S21, the CPU 21 determines whether the output signal of the motion sensor 13R or 13L exceeds a second predetermined value. The second predetermined value is set to a large value.

When the output signal of the motion sensor 13R or 13L exceeds the second predetermined value, it is considered that there are a plurality of people around the user 30. Therefore, when the output signal of the motion sensor 13R or 13L does not exceed the second predetermined value (NO), the CPU 21 moves the process to step S14 of FIG. 3 or 4, and notifies the user 30 that a third party has approached. When the output signal of the motion sensor 13R or 13L exceeds the second predetermined value (YES), in step S22, the CPU 21 turns off the notification to the user 30 and returns the process to step S21.

In the first configuration example shown in FIG. 6, the microphones 17R, 17L, and 27 are not used.

Figure 7:
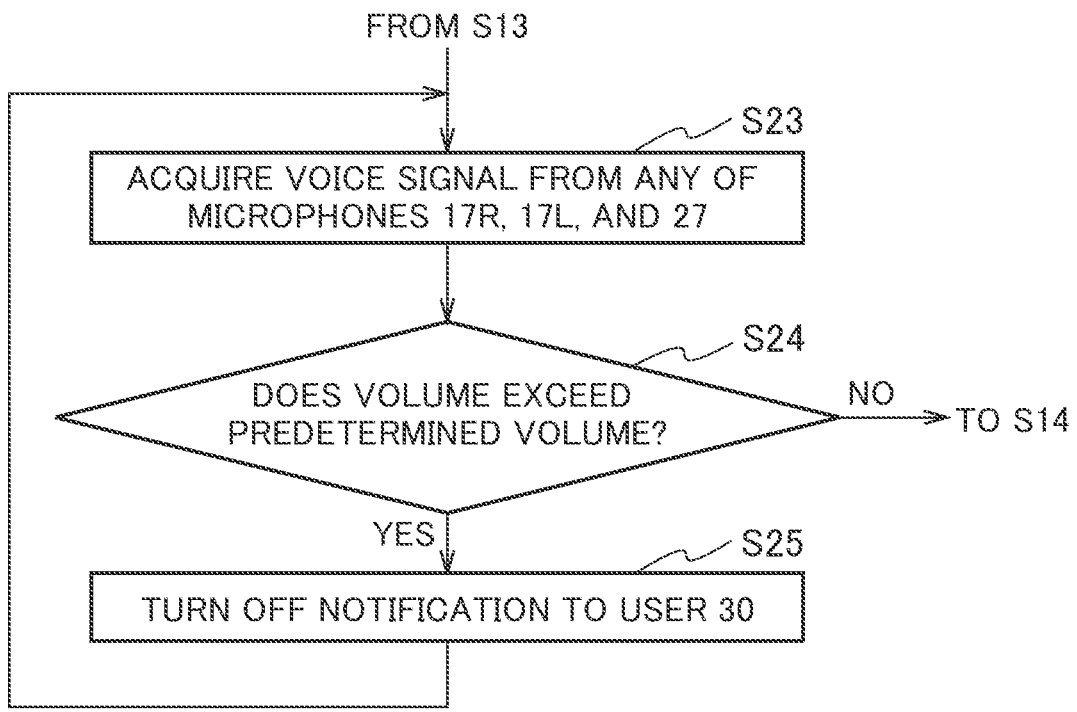
FIG. 7 is a flowchart illustrating a second example of the process executed in the mobile terminal according to a second embodiment.

With reference to the flowchart shown in FIG. 7, a second example executed by the mobile terminal 2 will be described, in which it is processed to not notify of the approach of a third party in a situation in which there are a plurality of people around the user 30. Steps S23 to S25 shown in FIG. 7 are provided between steps S13 and S14 in FIG. 3 or 4.

Figure 3:
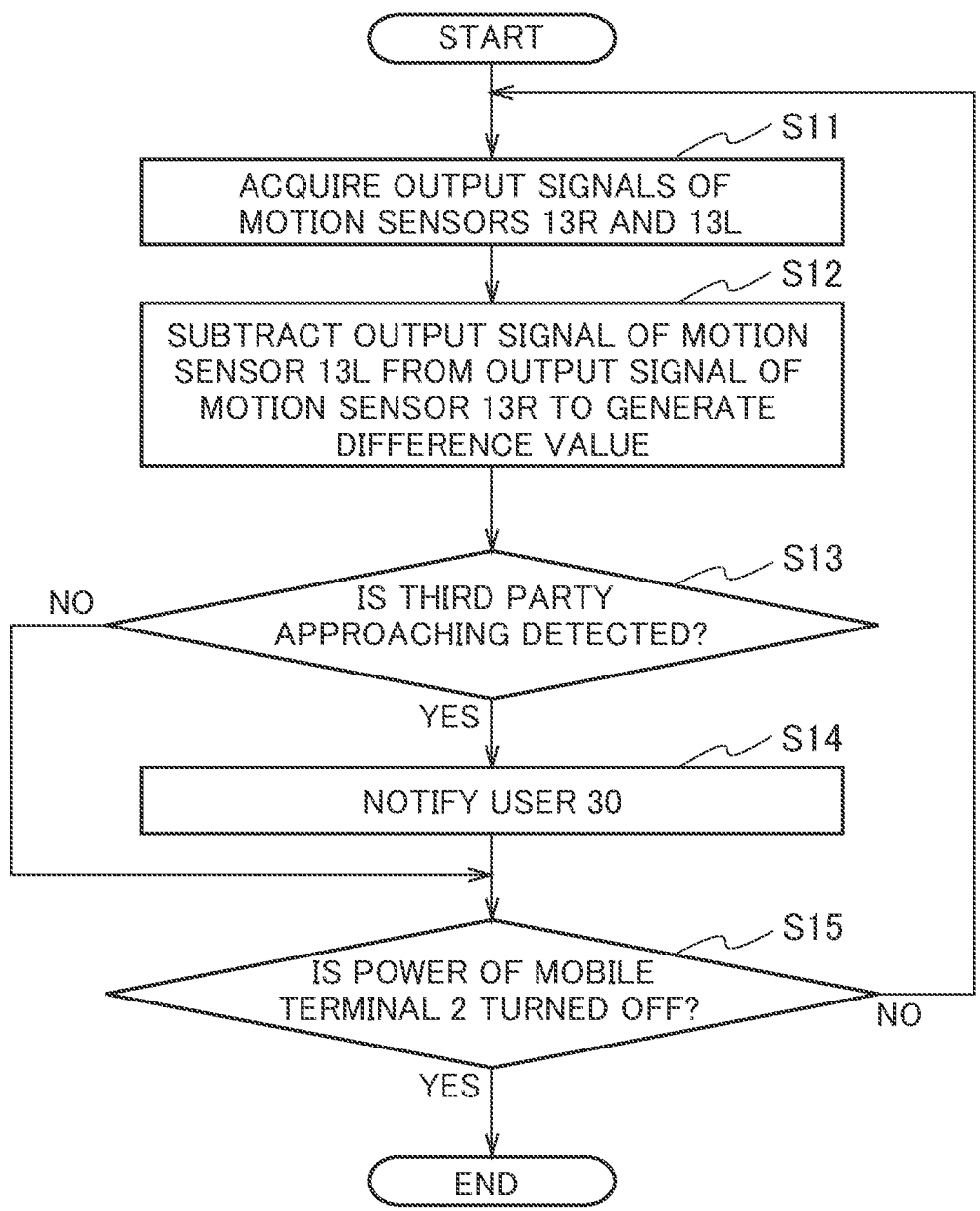
FIG. 3 is a flowchart illustrating a process executed in the mobile terminal according to a first embodiment.
Figure 4:
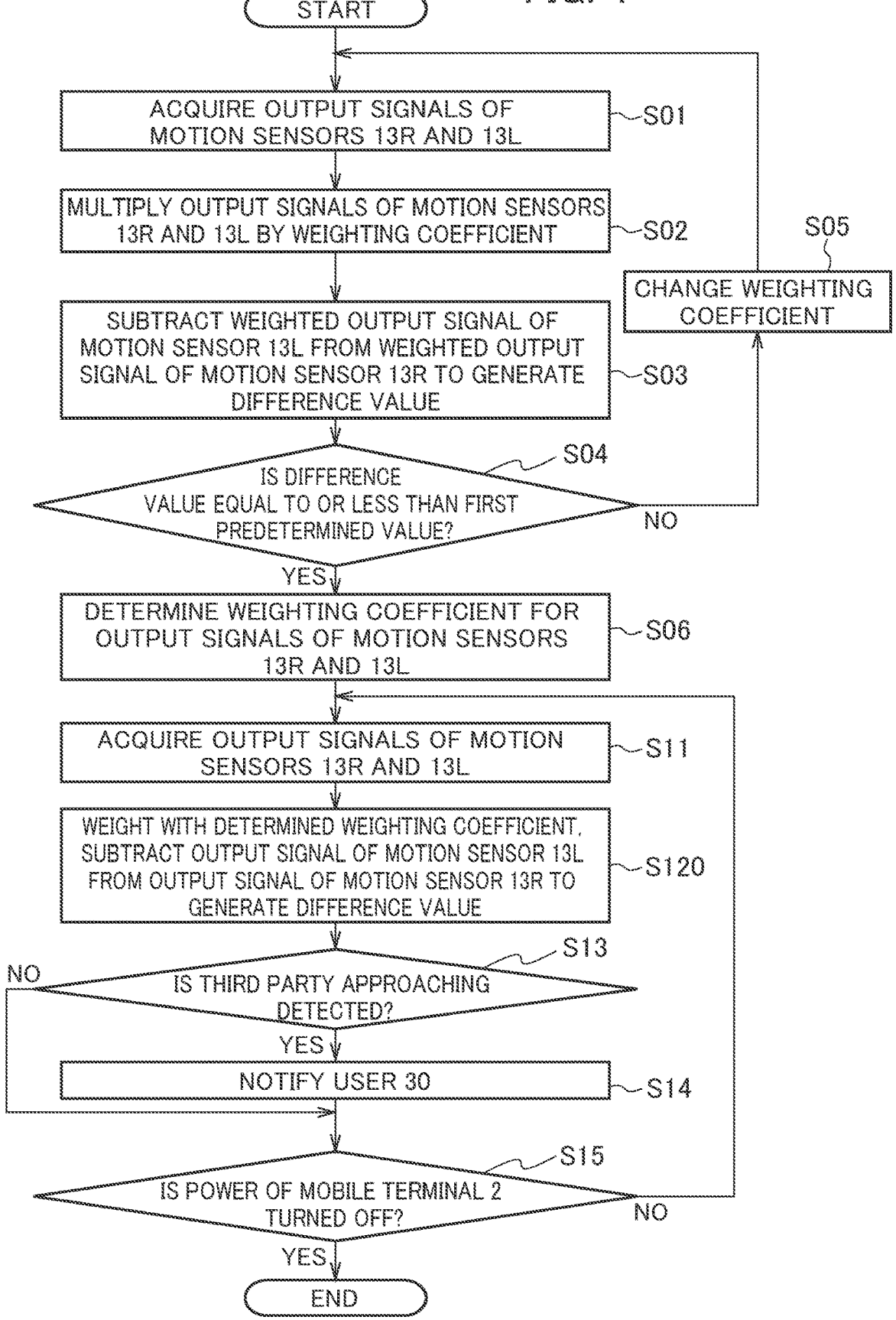
FIG. 4 is a flowchart illustrating a preferable process executed in the mobile terminal according to a first embodiment.

When the approach of a third party is detected in step S13 of FIG. 3 or 4, in step S23, the CPU 21 acquires a voice signal (or volume) from any of the microphones 17R, 17L, and 27. In step S24, the CPU 21 determines whether the volume exceeds a predetermined volume. When the volume does not exceed the predetermined volume (NO), the CPU 21 moves the process to S14 of FIG. 3 or 4, and notifies the user 30 that a third party has approached. When the volume exceeds the predetermined volume (YES), in step S25, the CPU 21 turns off the notification to the user 30 and returns the process to step S23.

As described above, in the mobile terminal 2 according to a second embodiment, when it is determined that a plurality of third parties are present around the user 30, the CPU 21 turns off the notification by the notification unit. When the first or second output signal exceeds the second predetermined value, the CPU 21 determines that a plurality of third parties are present around the user 30 and turns off the notification by the notification unit. When the voice signal picked up by the right earphone 1R, the left earphone 1L, or the microphones 17R, 17L, or 27 provided in the mobile terminal 2 exceeds a predetermined volume, the CPU 21 may determine that a plurality of third parties are present around the user 30 and turn off the notification by the notification unit.

In accordance with the mobile terminal 2 according to a second embodiment, in addition to the effect same as that of the mobile terminal 2 according to a first embodiment, it is also possible to prevent the user 30 from being notified of the approach of a third party when there are a plurality of people around the user 30.

Third Embodiment

Since the motion sensors 13R and 13L consume a considerable amount of power, in a situation in which the user 30 is not wearing the right earphone 1R or the left earphone 1L on the right ear or the left ear and not using the same, it is preferable to turn off the motion sensors 13R and 13L. The mobile terminal 2 according to a third embodiment is configured to turn off the motion sensors 13R and 13L when the user 30 is not using the right earphone 1R or the left earphone 1L.

Figure 8:
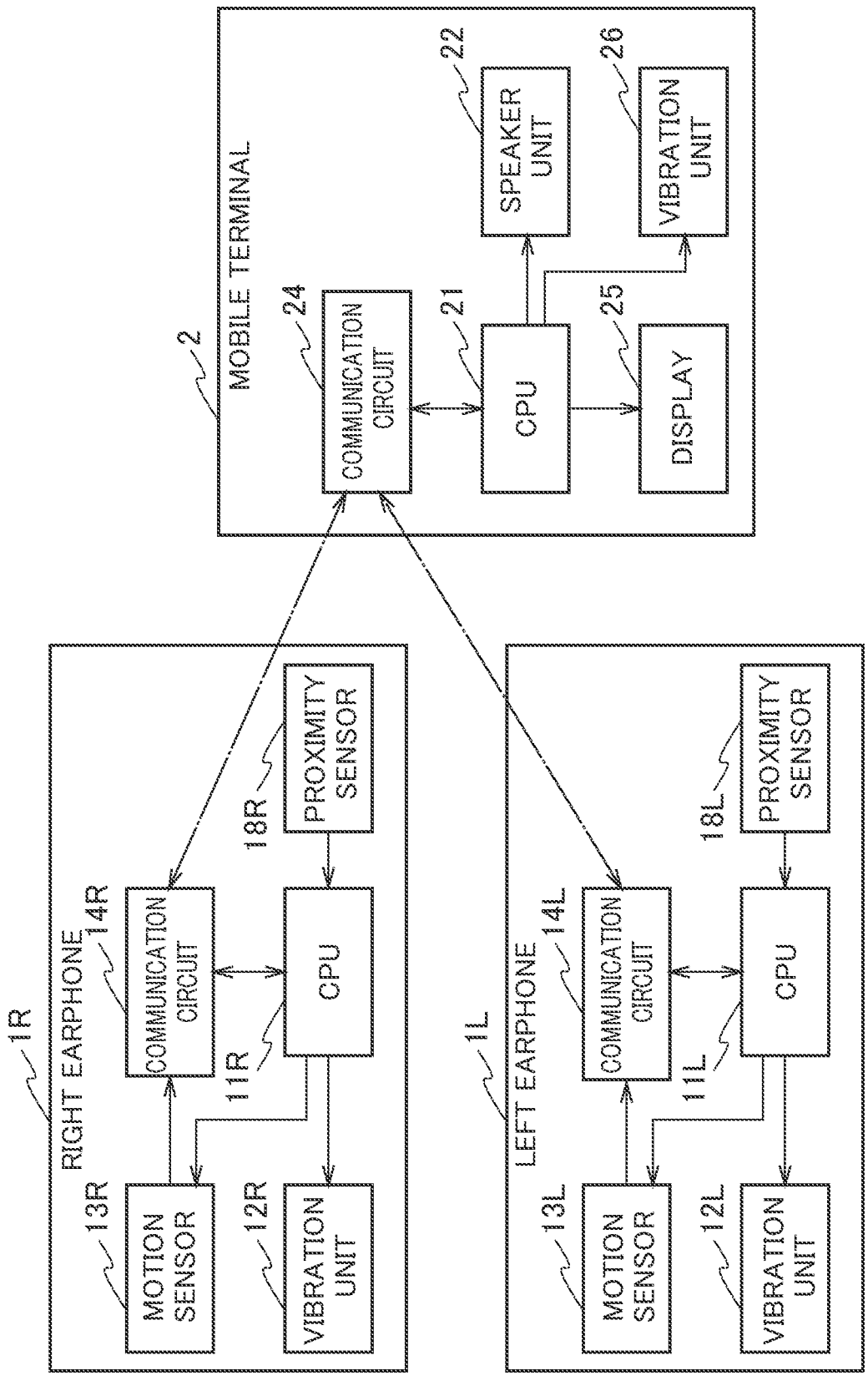
FIG. 8 is a block diagram illustrating a mobile terminal according to a third embodiment.

In FIG. 8, the right earphone 1R includes a proximity sensor 18R, and the left earphone 1L includes a proximity sensor 18L. The right earphone 1R and the left earphone 1L transmit the output signals of the proximity sensors 18R and 18L to the mobile terminal 2.

With reference to the flowchart shown in FIG. 9 and the timing chart shown in FIG. 10, a first example will be described, in which it is processed to turn off the motion sensors 13R and 13L when the user 30 is not using the right earphone 1R or the left earphone 1L. Steps S31 to S34 shown in FIG. 9 are provided between steps S11 and S12 in FIG. 3 or between steps S11 and S120 in FIG. 4. When the CPU 21 acquires the output signals of the motion sensors 13R and 13L in step S11 of FIG. 3 or 4, the process proceeds to step S31.

In step S31, the CPU 21 determines whether the output signal of the motion sensor 13R or 13L is equal to or less than a third predetermined value. The third predetermined value is a value smaller than, for example, 0.8 times a value of the output signal of when the user 30 is wearing the right earphone 1R and the left earphone 1L and there is no third party around the user 30. When the output signals of the motion sensors 13R and 13L are not equal to or less than the third predetermined value (NO), since it is determined that the user 30 is wearing the right earphone 1R and the left earphone 1L, the CPU 21 moves the process to step S12 or S120.

In step S31, when the output signal of the motion sensor 13R or 13L is equal to or less than the third predetermined value, since it is determined that the user 30 is not wearing the right earphone 1R or the left earphone 1L, in step S32, the CPU 21 instructs the right earphone 1R and the left earphone 1L to turn off the motion sensors 13R and 13L at predetermined time intervals.

In step S33, the CPU 21 determines whether the output signal exceeds the third predetermined value during an ON period of the motion sensors 13R and 13L. When the output signal does not exceed the third predetermined value (NO), since it is determined that the user 30 is not still wearing the right earphone 1R or the left earphone 1L, the CPU 21 repeats the processes of steps S32 and S33.

In step S33, when the output signal exceeds the third predetermined value (YES), it is determined that the user 30 has worn the right earphone 1R and the left earphone 1L. Therefore, in step S34, the CPU 21 instructs the right earphone 1R and the left earphone 1L to turn on the motion sensors 13R and 13L, and returns the process to step S31.

In FIG. 10, when the user 30 takes off the right earphone 1R or the left earphone 1L at time t1, as shown in (a), the value of the output signal becomes equal to or less than the third predetermined value, and as shown in (b), the motion sensors 13R and 13L are turned on and off repeatedly. When the user 30 wears the right earphone 1R and the left earphone 1L at time t2 at which the motion sensors 13R and 13L are turned on, as shown in (a), the value of the output signal exceeds the third predetermined value. Then, as shown in (b), the motion sensors 13R and 13L are always turned on.

In the first configuration example shown in FIG. 9, the proximity sensors 18R and 18L are not used.

Figure 11:
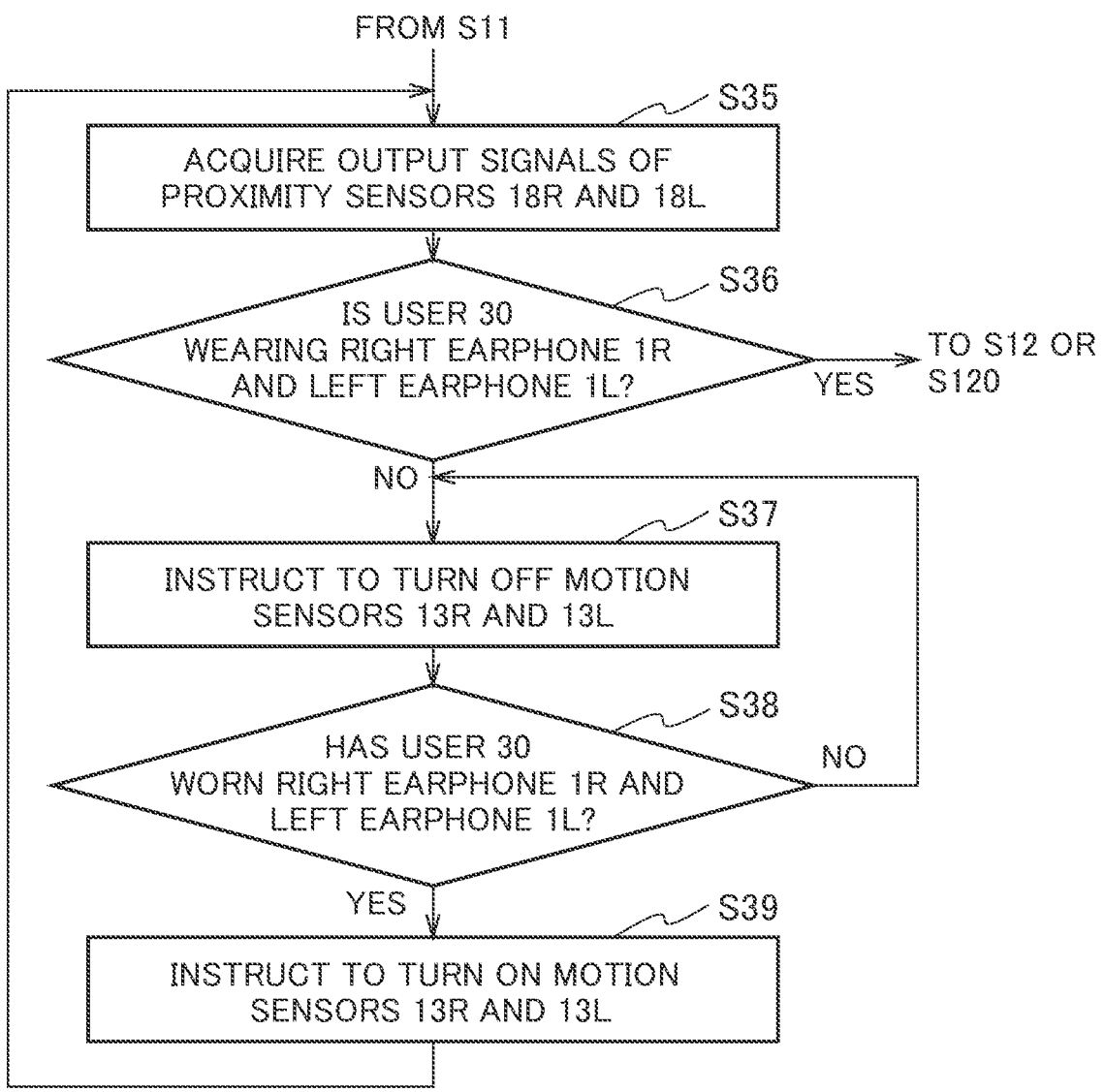
FIG. 11 is a flowchart illustrating a second example of the process executed in the mobile terminal according to a third embodiment.

With reference to the flowchart shown in FIG. 11, a second example will be described, in which it is processed to turn off the motion sensors 13R and 13L when the user 30 is not using the right earphone 1R and the left earphone 1L. In step S35, the CPU 21 acquires the output signals of the proximity sensors 18R and 18L. In step S36, the CPU 21 determines whether the user 30 is wearing the right earphone 1R and the left earphone 1L based on the values of the output signals of the proximity sensors 18R and 18L. When the output signals of the proximity sensors 18R and 18L are equal to or greater than a predetermined value, it can be determined that the user 30 is wearing the right earphone 1R and the left earphone 1L.

When the user 30 is wearing the right earphone 1R and the left earphone 1L in step S36 (YES), the CPU 21 moves the process to step S12 or S120. When the user 30 is not wearing the right earphone 1R or the left earphone 1L in step S36 (NO), in step S37, the CPU 21 instructs the right earphone 1R and the left earphone 1L to turn off the motion sensors 13R and 13L.

In step S38, the CPU 21 determines whether the user 30 has worn the right earphone 1R and the left earphone 1L based on the values of the output signals of the proximity sensors 18R and 18L. When the user 30 is not wearing the right earphone 1R or the left earphone 1L (NO), the CPU 21 repeats the processes of steps S37 and S38. When the user 30 is wearing the right earphone 1R and the left earphone 1L (YES), in step S39, the CPU 21 instructs the right earphone 1R and the left earphone 1L to turn on the motion sensors 13R and 13L, and returns the process to step S35.

As described above, in the mobile terminal 2 according to a third embodiment, the CPU 21 determines whether the user 30 is wearing the right earphone 1R and the left earphone 1L on the right ear and the left ear. When it is determined that the user 30 is not wearing the right earphone 1R and the left earphone 1L, the CPU 21 instructs the right earphone 1R and the left earphone 1L to turn off the motion sensors 13R and 13L at least intermittently.

The CPU 21 can determine whether the user 30 is wearing the right earphone 1R and the left earphone 1L based on whether the first and second output signals are equal to or less than a third predetermined value. The third predetermined value is a value smaller than the first and second output signals of when the user 30 is wearing the right earphone 1R and the left earphone 1L and there is no third party around the user 30, and is a value obtained by multiplying a coefficient less than 1.

In this case, when it is determined that the user 30 is not wearing the right earphone 1R and the left earphone 1L, the CPU 21 instructs the right earphone 1R and the left earphone 1L to turn off the motion sensors 13R and 13L at predetermined time intervals.

The CPU 21 can determine whether the user 30 is wearing the right earphone 1R and the left earphone 1L based on the output signals of the proximity sensors 18R and 18L. In this case, when it is determined that the user 30 is not wearing the right earphone 1R or the left earphone 1L, the CPU 21 instructs the right earphone 1R and the left earphone 1L to turn off the motion sensors 13R and 13L.

In accordance with the mobile terminal 2 according to a third embodiment, in addition to the effect same as that of the mobile terminal 2 according to a first embodiment, the motion sensors 13R and 13L can be turned off at least intermittently when the user 30 is not using the right earphone 1R or the left earphone 1L. Therefore, it is possible to reduce the power consumption of the right earphone 1R and the left earphone 1L.

Fourth Embodiment

It may be preferable to notify the user 30 of the approach of a third party only at a specific place such as on a less crowded street. It may be preferable to notify the user 30 of the approach of a third party only at a specific time such as at night. The mobile terminal 2 according to a fourth embodiment is configured to notify the user 30 of the approach of a third party only at a specific place or only at a specific time.

Figure 12:
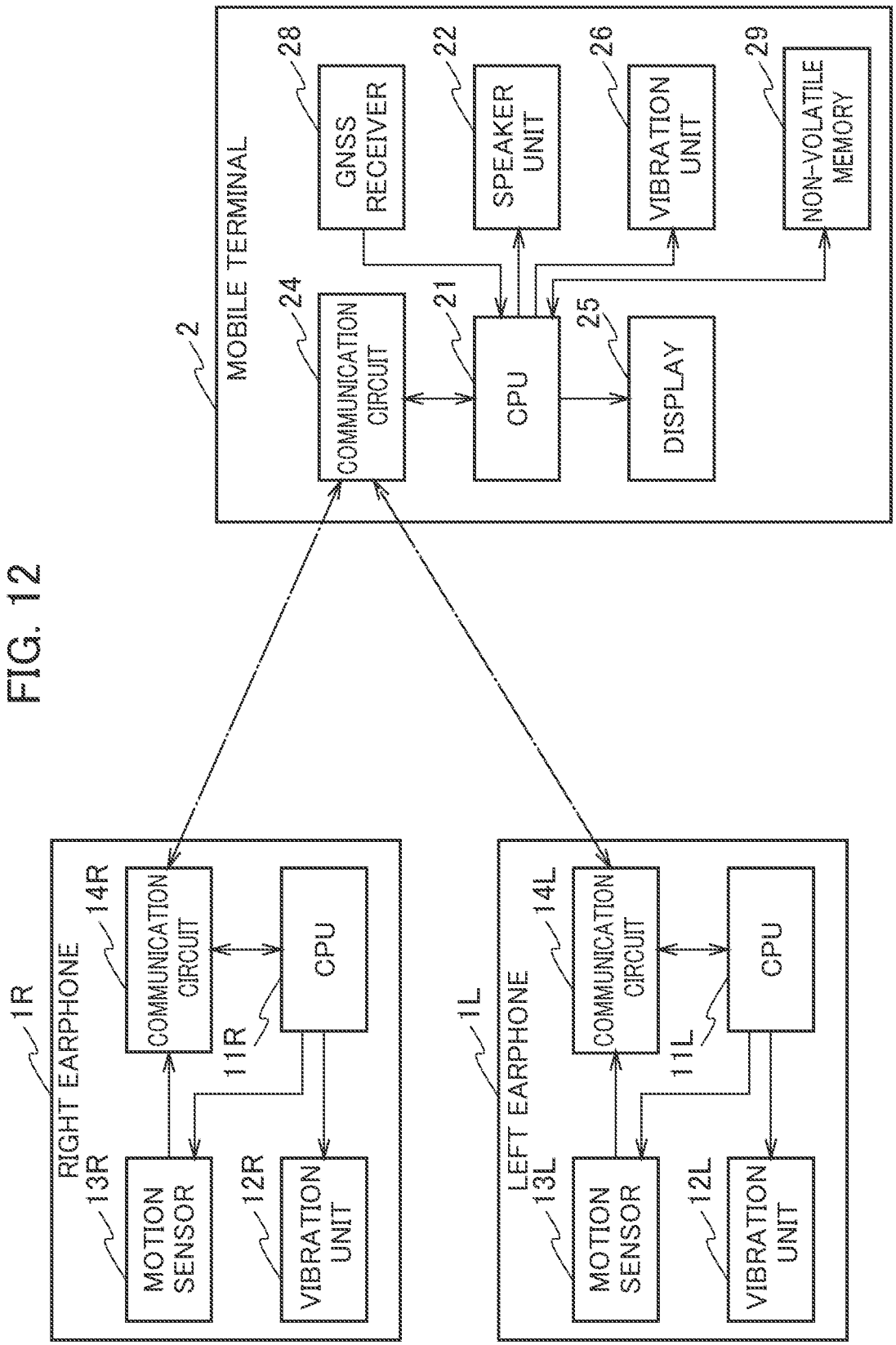
FIG. 12 is a block diagram illustrating a mobile terminal according to a fourth embodiment.

In FIG. 12, the mobile terminal 2 includes a global navigation satellite system (GNSS) receiver 28 that receives GNSS signals from a plurality of satellites for the GNSS. The GNSS is global positioning system (GPS) as an example. The CPU 21 calculates the current position of the mobile terminal 2 based on the GNSS signals from three or more satellites received by the GNSS receiver 28. The CPU 21 acquires the current time based on the GNSS signal.

The method of acquiring the current position and the current time of the mobile terminal 2 is not limited to the method based on the GNSS signal. A processor other than the CPU 21 may calculate the current position of the mobile terminal 2 based on the GNSS signal and supply the position information to the CPU 21. The current position may be calculated based on the position of the base station of the mobile phone line or the wireless LAN. The mobile terminal 2 may acquire the current time based on the standard radio wave.

A non-volatile memory 29 stores information on a preset location (designated area) and information on a time (designated time) of notifying the user 30 of the approach of a third party. The user 30 operates an operation unit (not shown) to set the designated area and the designated time and stores them in the non-volatile memory 29. A designated area may be set by latitude and longitude, or districts or streets of a specific town may be set as the designated area. A designated time may be set by a combination of a start time for starting the notification of the approach and an end time for ending the notification of approach, or may be set as a designated time such as 3 hours from a predetermined time.

The process of notifying the user 30 of the approach of a third party only at a specific place and at a specific time will be described with reference to the flowchart shown in FIG. 13. Steps S41 and S42 shown in FIG. 13 are provided between steps S13 and S14 of FIG. 3 or 4.

Figure 13:
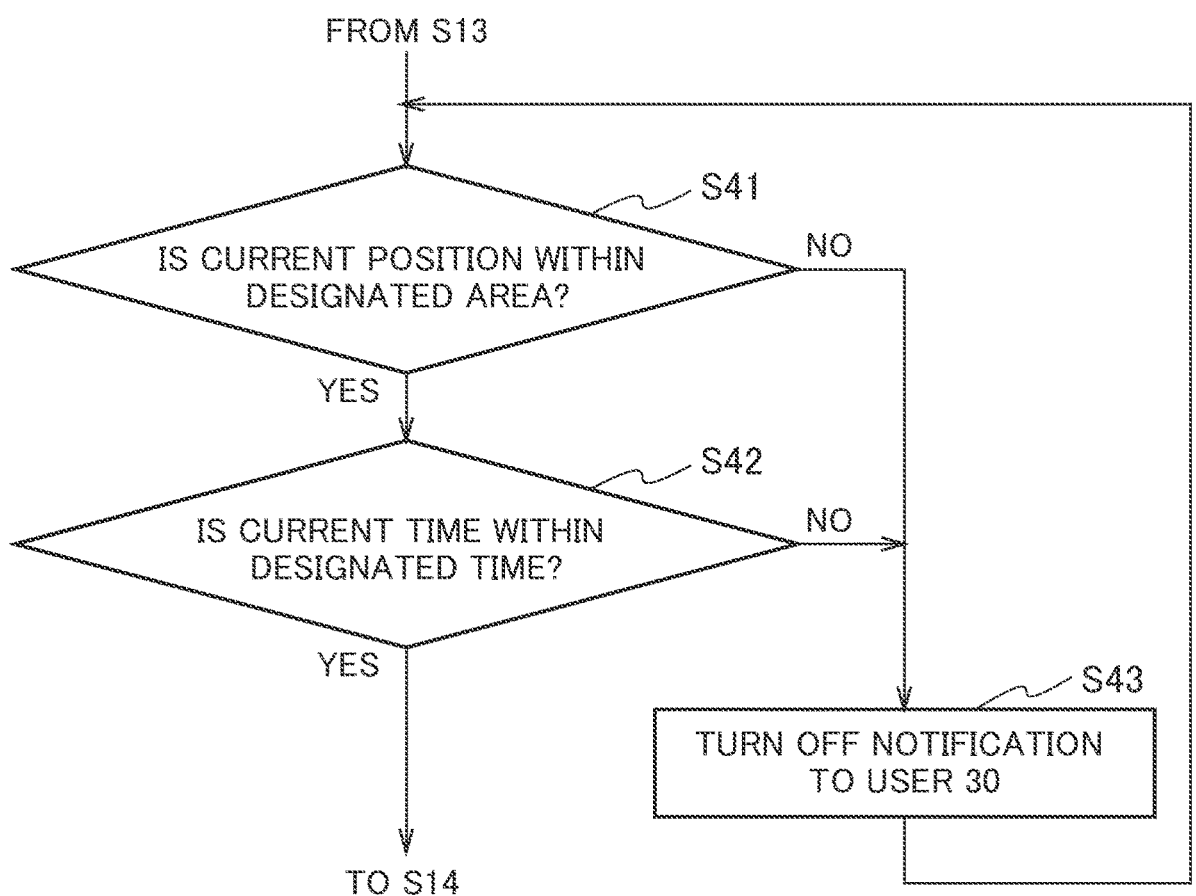
FIG. 13 is a flowchart illustrating a process executed in the mobile terminal according to a fourth embodiment.

In FIG. 13, in step S41, the CPU 21 determines whether the current position is within the designated area. When the current position is not within the designated area (NO), in step S43, the CPU 21 turns off the notification to the user 30 and returns the process to step S41.

When the current position is within the designated area (YES), in step S42, the CPU 21 determines whether the current time is within the designated time. When the current time is not within the designated time (NO), in step S43, the CPU 21 turns off the notification to the user 30 and returns the process to step S41. When the current time is within the designated time (YES), the CPU 21 moves the process to step S14.

Although FIG. 13 illustrates that the user 30 may be notified of the approach of a third party only when the current position is within the designated area and the current time is within the designated time, the user 30 may also be notified of the approach of a third party when the current position is within the designated area regardless of the current time. The user 30 may be notified of the approach of a third party when the current time is within the designated time regardless of the current position.

As described above, the mobile terminal 2 according to a fourth embodiment includes a current position acquisition unit that acquires the current position, and a storage unit that stores a designated area indicating a place for notifying the user 30 of the approach of a third party. The CPU 21 and the GNSS receiver 28 are examples of the current position acquisition unit. The non-volatile memory 29 is an example of the storage unit. The CPU 21 turns off the notification to the user 30 when the current position is not within the designated area.

The mobile terminal 2 according to a fourth embodiment includes a current time acquisition unit that acquires the current time, and a storage unit that stores a designated time indicating a time for notifying the user 30 of the approach of a third party. The CPU 21 and the GNSS receiver 28 are examples of the current time acquisition unit. The non-volatile memory 29 is an example of the storage unit. The storage unit that stores the designated area and the storage unit that stores the designated time may be the same storage unit or may be different storage units from each other. The CPU 21 turns off the notification to the user 30 when the current time is not the designated time.

In accordance with the mobile terminal 2 according to a fourth embodiment, in addition to the effect same as that of the mobile terminal 2 according to a first embodiment, it is also possible to notify the user 30 of the approach of a third party only at a specific place or only at a specific time. Since the approach of a third party is not notified at a place or time where notification is not required, it is possible to prevent unnecessary notification. It is desirable to turn off the motion sensors 13R and 13L in order to reduce power consumption in areas other than the designated area.

Fifth Embodiment

When the user 30 is riding on a high-speed moving object such as a train, a car, or an airplane, it is not necessary to notify the user 30 of the approach of a third party. When the user 30 is moving at low speed, such as when traveling by bicycle, riding on a skateboard or roller skates, it is better to notify the user 30 of the approach of a third party. The mobile terminal 2 according to a fifth embodiment is configured to turn off the notification to the user 30 when it is assumed that the user is riding on a high-speed moving object.

Figure 14:
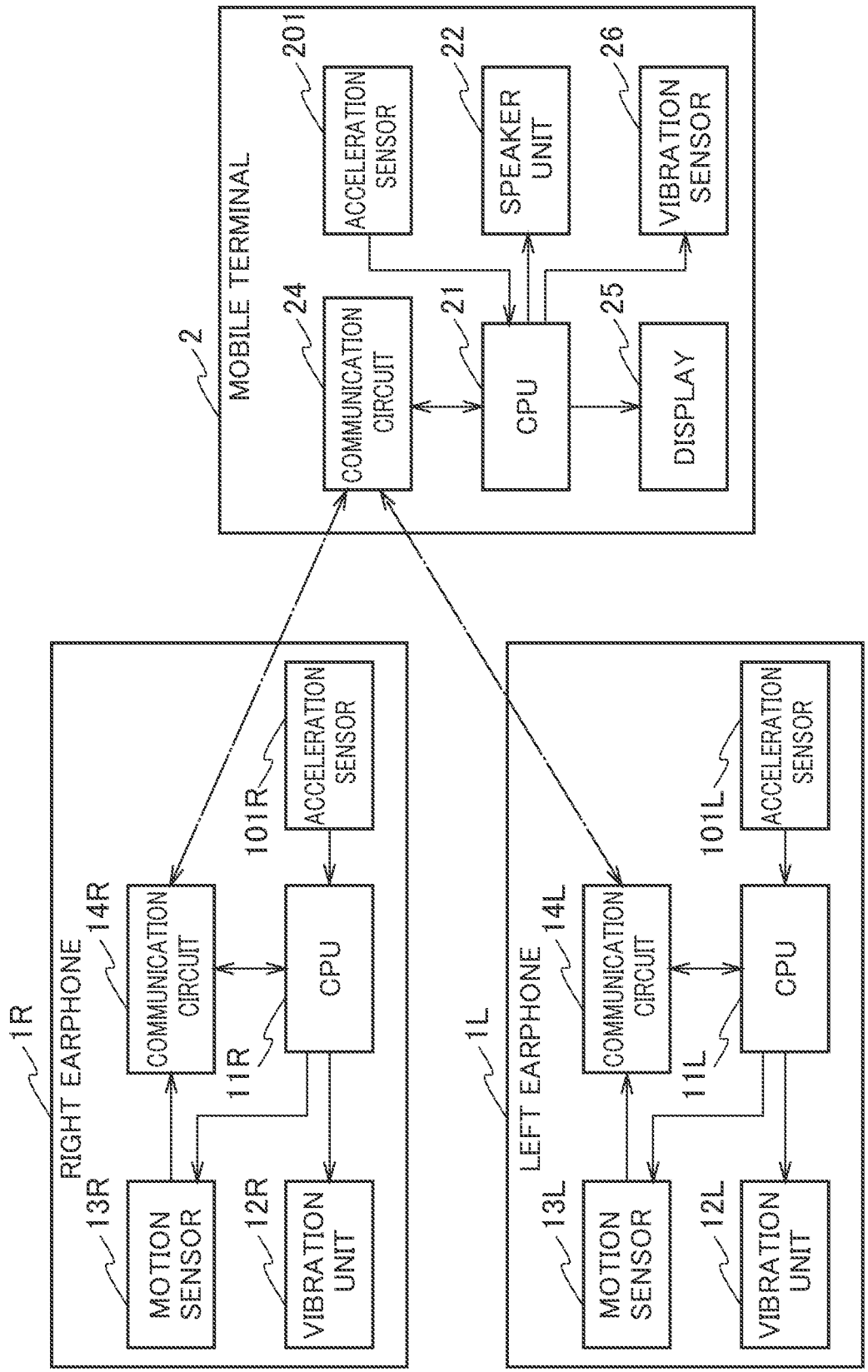
FIG. 14 is a block diagram illustrating a mobile terminal according to a fifth embodiment.

In FIG. 14, the right earphone 1R includes an acceleration sensor 101R, and the left earphone 1L includes an acceleration sensor 101L. The right earphone 1R and the left earphone 1L transmit the output signals of the acceleration sensors 101R and 101L to the mobile terminal 2. The mobile terminal 2 includes an acceleration sensor 201. Only the mobile terminal 2 may include the acceleration sensor 201, and the right earphone 1R and the left earphone 1L may not include the acceleration sensors 101R and 101L. Only the right earphone 1R and the left earphone 1L may include the acceleration sensors 101R and 101L, and the mobile terminal 2 may not include the acceleration sensor 201.

Figure 15:
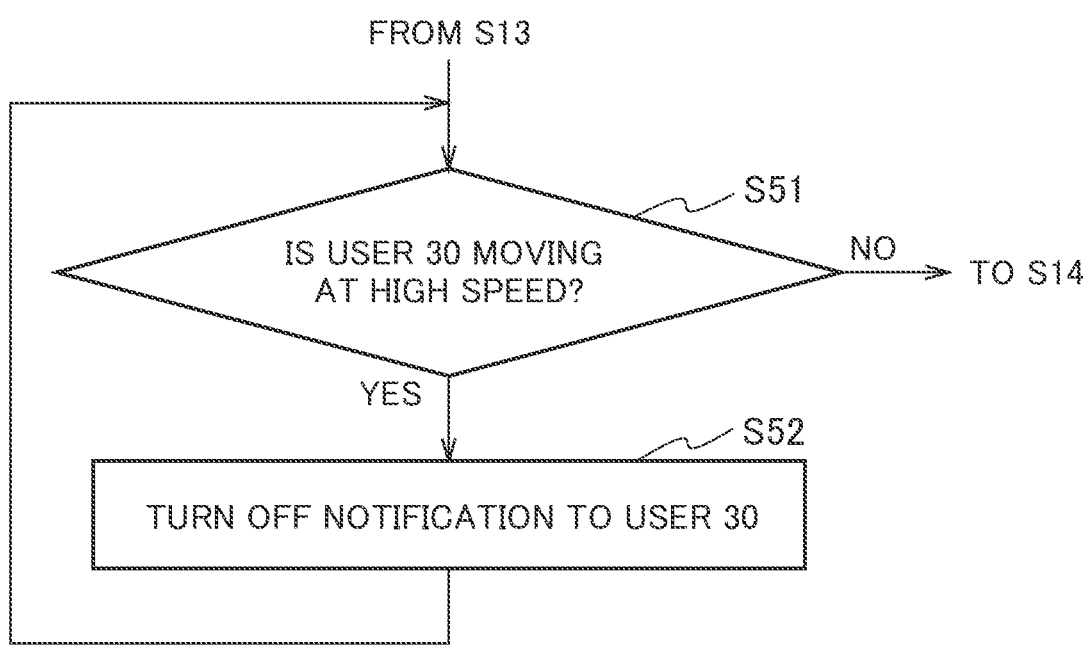
FIG. 15 is a flowchart illustrating a process executed in the mobile terminal according to a fifth embodiment.

With reference to the flowchart shown in FIG. 15, the process of turning off the notification to the user 30 when it is assumed that the user is riding on a high-speed moving object will be described. Steps S51 and S52 shown in FIG. 15 are provided between steps S13 and S14 of FIG. 3 or 4. In step S51, the CPU 21 determines whether the user 30 is moving at high-speed based on the output signal of the acceleration sensor 101R, 101L, or 201.

For example, the high-speed means a speed of 30 km/h or higher. The CPU 21 integrates the acceleration measured by the acceleration sensors 101R, 101L, or 201 to obtain the speed. When the obtained movement speed of the user 30 is 30 km/h or higher, the CPU 21 determines that the user 30 is moving at a high-speed. When the user 30 is not moving at high-speed (NO), the CPU 21 moves the process to step S14. When the user 30 is moving at high-speed (YES), in step S52, the CPU 21 turns off the notification to the user 30 and returns the process to S51.

As described above, the mobile terminal 2 according to a fifth embodiment includes a movement speed acquisition unit that acquires the movement speed of the user 30. The CPU 21 serves as a movement speed acquisition unit. The notification unit turns off the notification to the user 30 when the movement speed of the user 30 acquired by the movement speed acquisition unit is equal to or higher than a predetermined speed. The movement speed acquisition unit can obtain the movement speed of the user 30 based on the acceleration acquired by the acceleration sensors 101R, 101L, or 201 provided in the right earphone 1R, the left earphone 1L, or the mobile terminal 2.

In accordance with the mobile terminal 2 according to a fifth embodiment, in addition to the effect same as that of the mobile terminal 2 according to a first embodiment, it is possible to prevent the user 30 from being notified when riding on a high-speed moving object such as a train, a car, or an airplane.

Sixth Embodiment

When the CPU 21 detects that a third party has approached the user 30 and notifies it to the user 30, it is not necessary to continue the notification to the user 30 when the user 30 perceives the third party. The mobile terminal 2 according to a sixth embodiment is configured to turn off the notification to the user 30 when it is assumed that the user 30 has confirmed the third party.

Figure 16:
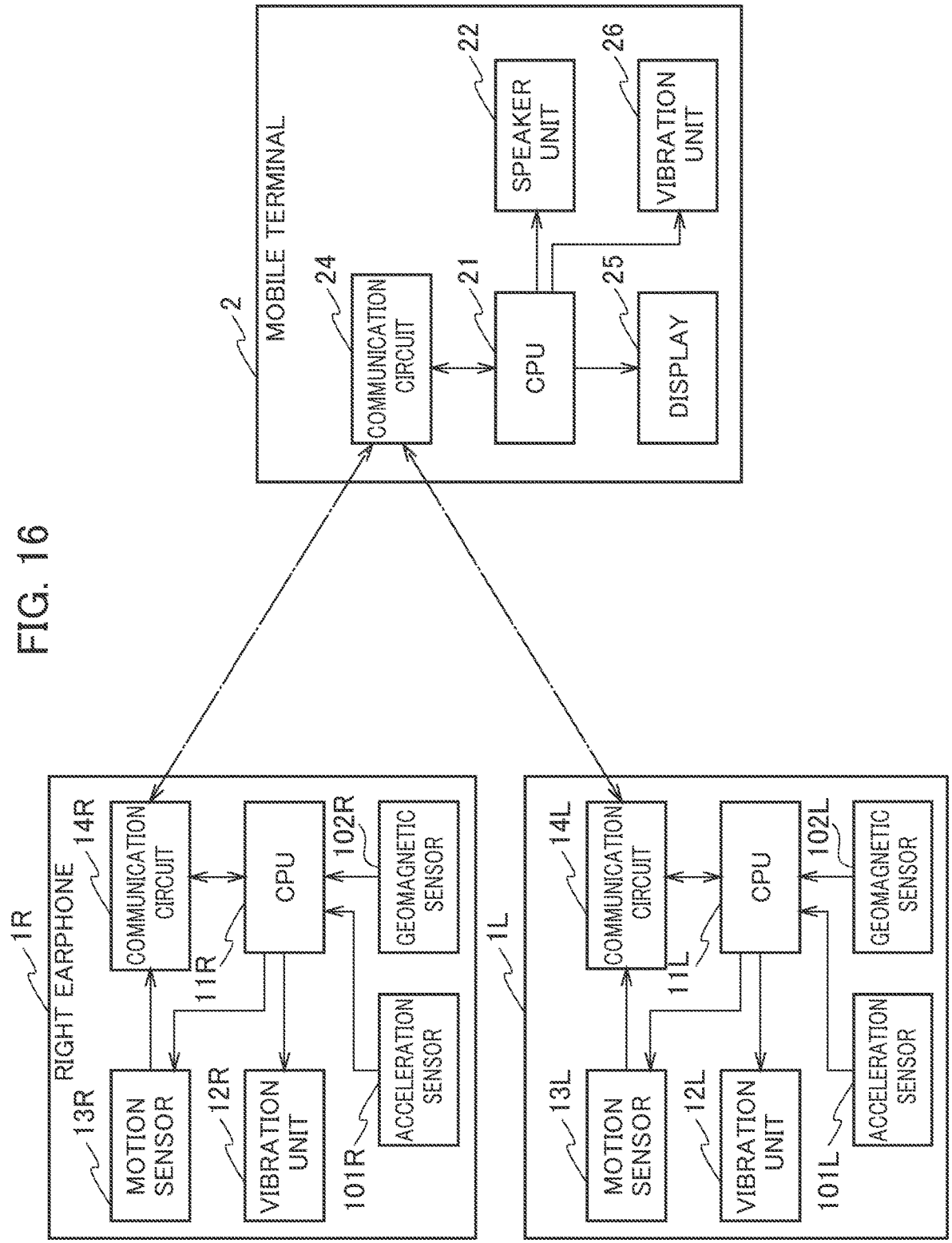
FIG. 16 is a block diagram illustrating a mobile terminal according to a sixth embodiment.

In FIG. 16, the right earphone 1R includes the acceleration sensor 101R and a geomagnetic sensor 102R, and the left earphone 1L includes the acceleration sensor 101L and a geomagnetic sensor 102L. The right earphone 1R and the left earphone 1L transmit the output signals of the acceleration sensors 101R and 101L and the output signals of the geomagnetic sensors 102R and 102L to the mobile terminal 2. While it is not essential to provide the geomagnetic sensors 102R and 102L, it is preferable to provide them.

Figure 17:
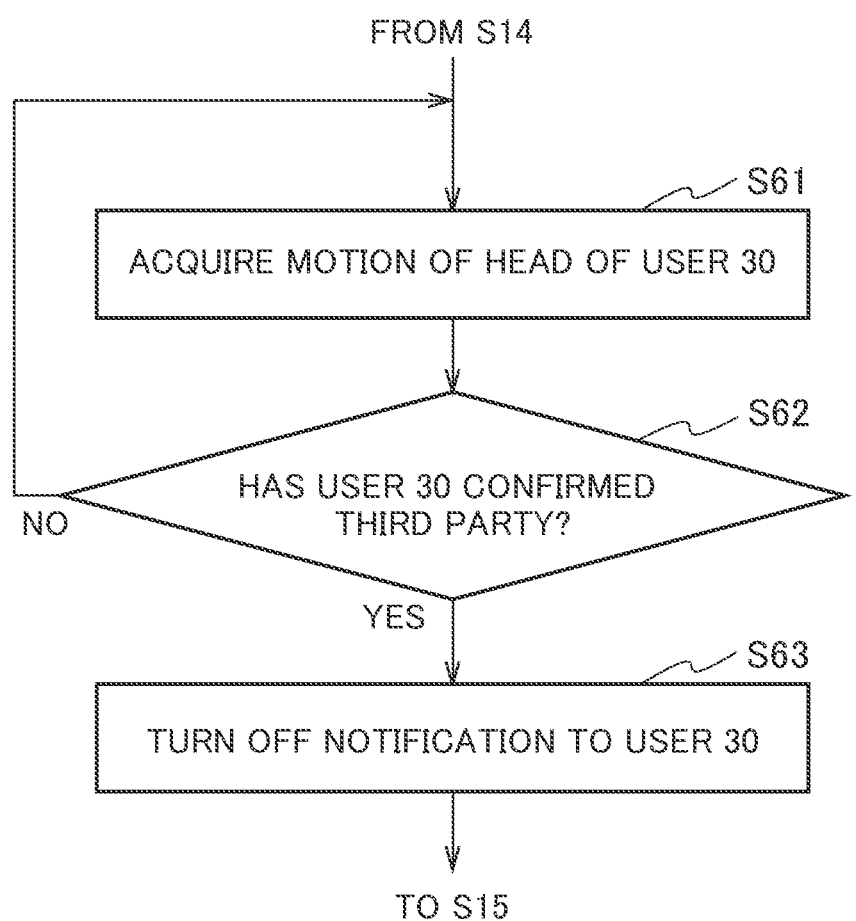
FIG. 17 is a flowchart illustrating a process executed in the mobile terminal according to a sixth embodiment.

With reference to the flowchart shown in FIG. 17, the process of turning off the notification to the user 30 when it is assumed that the user 30 has confirmed the third party, will be described. Steps S61 to S63 shown in FIG. 17 are provided between steps S14 and S15 of FIG. 3 or 4. After the CPU 21 detects the approach of a third party and notifies it to the user 30, in step S61, the CPU 21 acquires a motion of a head of the user 30.

The CPU 21 can acquire the motion of the head of the user 30 based on the output signals of the acceleration sensors 101R and 101L, or based on the output signals of the acceleration sensors 101R and 101L and the output signals of the geomagnetic sensors 102R and 102L. When acquiring the motion of the head based on the output signals of the geomagnetic sensors 102R and 102L in addition to the output signals of the acceleration sensors 101R and 101L, the CPU 21 can acquire the motion of the head with higher accuracy.

In step S62, the CPU 21 determines whether it is assumed that the user 30 has confirmed the third party based on the motion of the head. When the face of the user 30 faces toward the approaching third party and then moves such that the face returns to the original direction, it can be assumed that the third party has been confirmed. When it is not assumed that the user 30 has confirmed the third party (NO), the CPU 21 repeats the processes of steps S61 and S62. When it is assumed that the user 30 has confirmed the third party (YES), in step S63, the CPU 21 turns off the notification to the user 30 and moves the process to step S15.

As described above, the mobile terminal 2 according to a sixth embodiment includes the motion acquisition unit that acquires the motion of the head of the user 30. The CPU 21 serves as the motion acquisition unit that acquires the motion of the head of the user 30 based on at least the output signals of the acceleration sensors 101R and 101L. After the notification unit notifies the user 30 that a third party has approached, when the motion acquisition unit acquires the motion of the head of the user 30 by which it is assumed that a third party has been confirmed, the notification unit turns off the notification to the user 30.

In accordance with the mobile terminal 2 according to a sixth embodiment, in addition to the effect same as that of the mobile terminal 2 according to a first embodiment, it is possible to turn off the notification to the user 30 when it is assumed that the user 30 has confirmed the third party. Therefore, it is possible to prevent the user 30 from being notified more than necessary.

Seventh Embodiment

Even when the third party is stopped, as the distance between the user 30 and the third party is decreased, the CPU 21 may detect the approach of the third party and notify the user 30. Since the motion sensors 13R and 13L detect far infrared rays generated by a heat source, they may detect a stopped vehicle or the like and notify the user 30 of it. When any stopped heat source, such as a third party, is present, and when the heat source relatively approaches the user 30 as the user 30 moves, causing the motion sensor 13R or 13L to generate an output signal, there is no need to notify to the user 30.

The mobile terminal 2 according to a seventh embodiment is configured to turn off the notification to the user 30 when any stopped heat source being relatively approaches the user 30 and the CPU 21 detects the heat source as a third party approaching the user 30.

Figure 18:
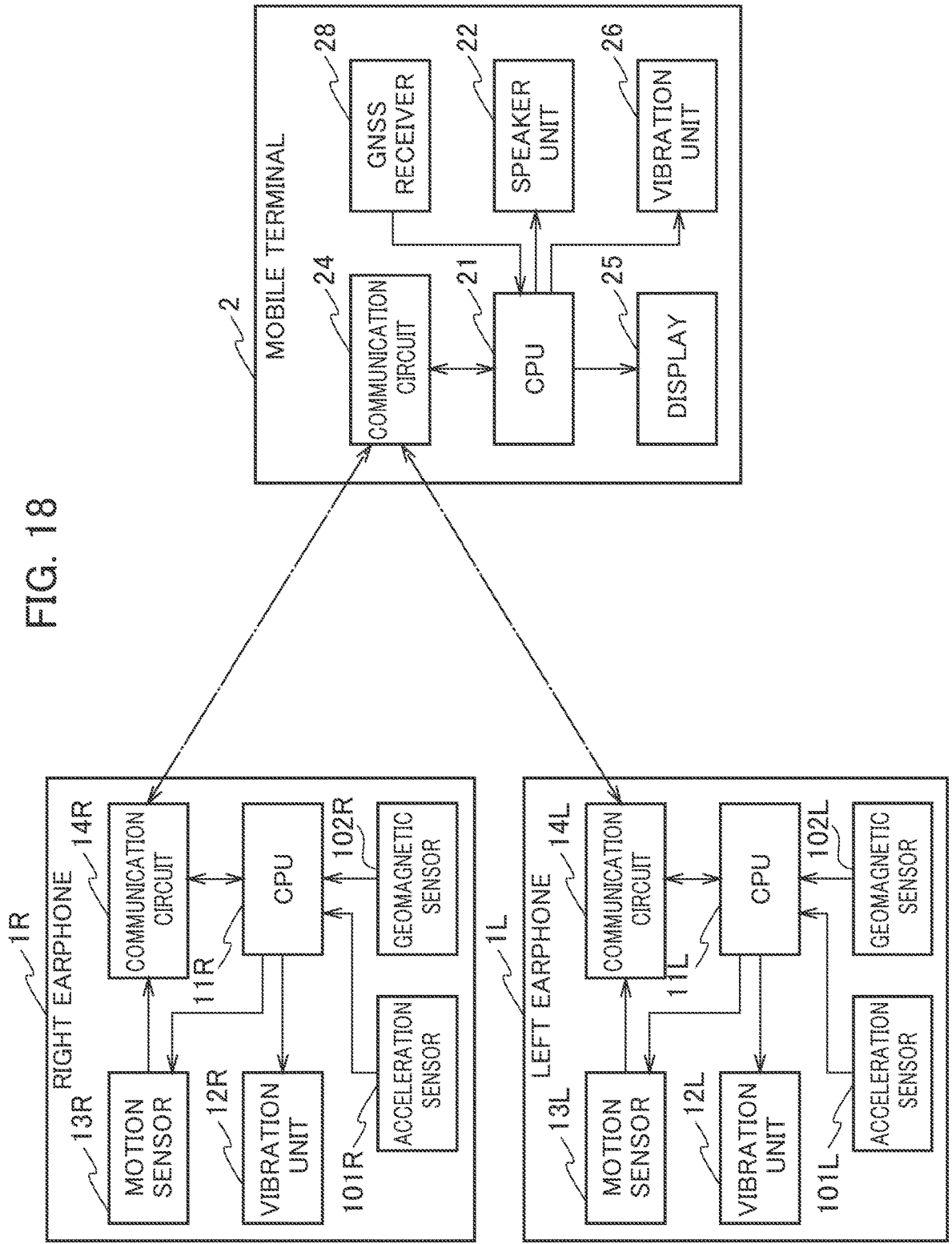
FIG. 18 is a block diagram illustrating a mobile terminal according to a seventh embodiment.

In FIG. 18, the right earphone 1R includes the acceleration sensor 101R and the geomagnetic sensor 102R, and the left earphone 1L includes the acceleration sensor 101L and the geomagnetic sensor 102L. The right earphone 1R and the left earphone 1L transmit the output signals of the acceleration sensors 101R and 101L and the output signals of the geomagnetic sensors 102R and 102L to the mobile terminal 2. The mobile terminal 2 includes the GNSS receiver 28. The GNSS receiver 28 calculates the current position of the mobile terminal 2.

With reference to the flowchart shown in FIG. 19, the process of turning off the notification to the user 30 when a stopped heat source is relatively approaching the user 30 will be described. Steps S71 to S75 shown in FIG. 19 are provided between steps S13 and S14 or S15 of FIG. 3 or 4.

Figure 19:
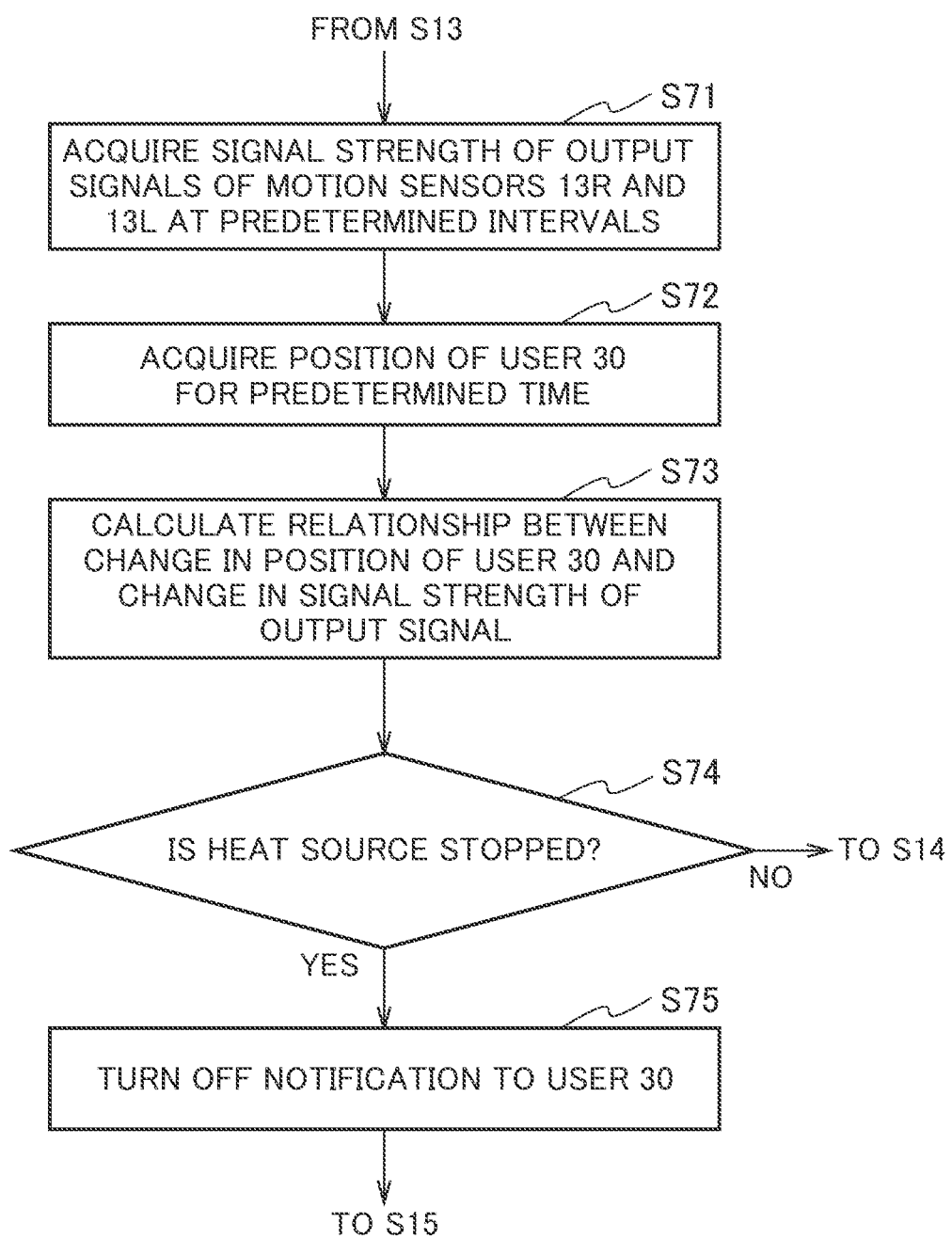
FIG. 19 is a flowchart illustrating a process executed in the mobile terminal according to a seventh embodiment.

In FIG. 19, in step S71, the CPU 21 acquires the signal strength of the output signals of the motion sensors 13R and 13L at predetermined intervals. In step S72, the CPU 21 acquires the position of the user 30 for a predetermined time. The CPU 21 may intermittently acquire the position of the user 30 within a predetermined time. In step S73, the CPU 21 calculates the relationship between the change in the position of the user 30 and the change in the signal strength of the output signal.

Figure 20:
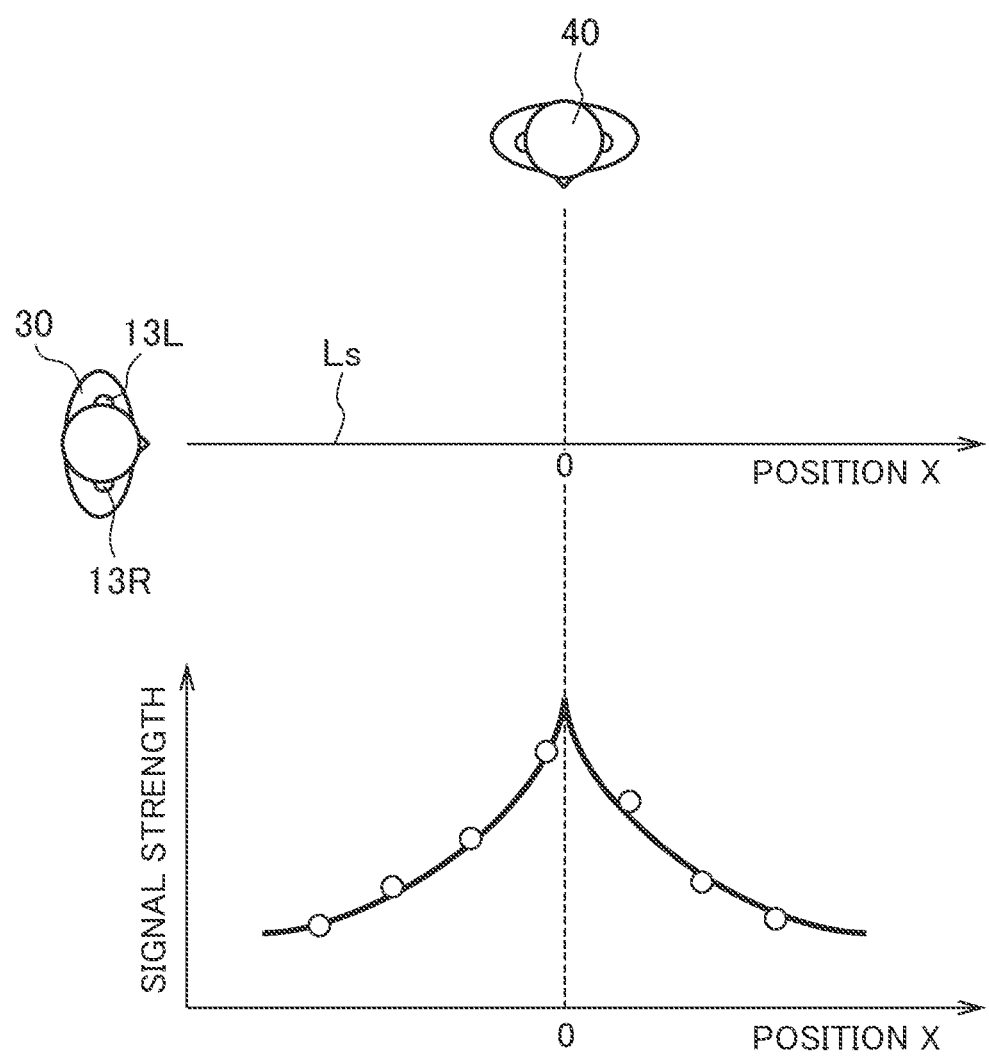
FIG. 20 is a diagram illustrating a relationship between a change in a position of a user and a change in a signal strength of an output signal of a motion sensor, when a stopped heat source relatively moves closer to and away from the user as the user moves.

In FIG. 20, it is assumed that the user 30 moves on a straight line Ls from the left side to the right side. It is assumed that a third party 40 is present while stopped at a position 0 as the position x of the straight line Ls and at a position separated away from the straight line Ls by a predetermined distance in a direction orthogonal to the straight line Ls. Here, the signal strength of the output signal of the motion sensor 13L gradually increases as the user 30 approaches the position 0, and gradually decreases as the user 30 passes the position 0 and moves away from the position 0. In the characteristic diagram showing the relationship between the position x and the signal strength, the white dots indicate the signal strength of the output signal acquired at predetermined intervals in step S71.

The CPU 21 acquires the current position of the mobile terminal 2 (user 30) based on the GNSS signal, but since the position accuracy is not so high, it is preferable to acquire the position of the user 30 based on the output signal of the acceleration sensor 101R or 101L to improve the position accuracy. The acceleration, which is the output signal of the acceleration sensor 101R or 101L, can be integrated to be converted into a speed, and position information can be obtained by further integrating the speed.

As shown in FIG. 20, when any stopped heat source, such as a third party 40, is present, and the user 30 is moving linearly, the position x and the signal strength of the output signal of the motion sensor 13R or 13L have a relationship of $k/(x^2)$, where k is a proportionality constant. The CPU 21 can determine whether the stopped heat source is in a state of relatively approaching the user 30, depending on whether the relationship between the change in the position of the user 30 and the change in the signal strength is proportional to $1/(x^2)$, based on the positions of at least three points of the user 30 and the signal strength of at least three points of the output signal.

Based on this principle, in step S74, the CPU 21 determines whether the heat source is stopped. When the heat source is not stopped (NO), the CPU 21 moves the process to step S14 and notifies the user 30 that a third party has approached. When the heat source is stopped (YES), in step S75, the CPU 21 turns off the notification to the user 30 and moves the process to step S15.

In the process shown in FIG. 19, the output signals of the geomagnetic sensors 102R and 102L are not used.

In the situation as shown in FIG. 20, it is not necessary to notify the user 30 when the stopped heat source is relatively approaching the user 30, but when it is assumed that the user 30 does not perceive the stopped heat source by looking aside or the like, it is preferable to notify the user 30 of it.

Figure 21:
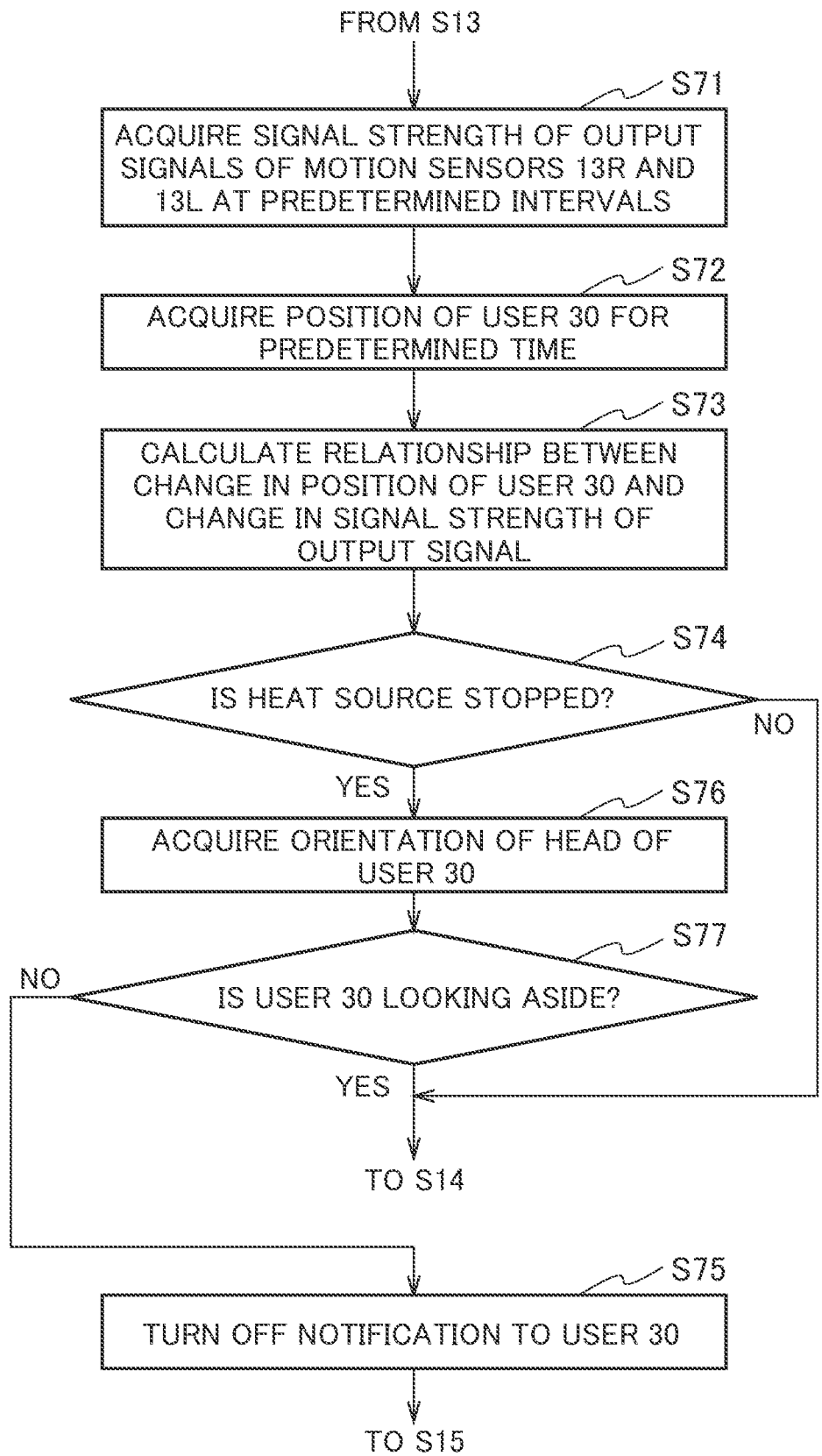
FIG. 21 is a flowchart illustrating a preferable process executed in the mobile terminal according to a seventh embodiment.

With reference to the flowchart shown in FIG. 21, in addition to the process shown in FIG. 19, the process for notifying the user 30 when it is assumed that the user 30 does not perceive the heat source, will be described. In FIG. 21, in step S74, when the heat source is stopped (YES), in step S76, the CPU 21 acquires the orientation of the head of the user 30 based on the output signals of the geomagnetic sensors 102R and 102L.

Figure 22:
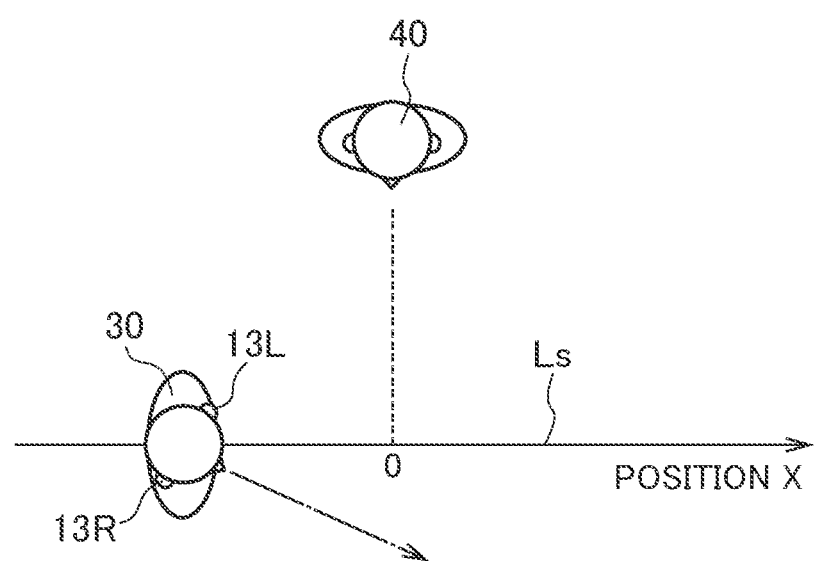
FIG. 22 is a diagram illustrating an example of a state in which it is assumed that the user does not perceive a stopped heat source.

In step S77, the CPU 21 determines whether the user 30 is looking aside. As shown in FIG. 22, when the user 30 is moving from the left side to the right side on the straight line Ls and the head direction of the user 30 is not facing toward the third party 40 side as indicated by the one-dash chain line, it is assumed that the user 30 does not perceive the third party 40. In this case, the CPU 21 determines that the user 30 is looking aside (YES), and moves the process to step S14 and notifies the user 30 that a third party has approached.

The degrees of deviation between the direction in which the user 30 is moving and the direction in which the head is directed, for determining that the user 30 is looking aside, may be appropriately set. For example, the CPU 21 may determine that the user 30 is looking aside when the direction in which the user 30 is moving is deviated by 30 degrees or more with respect to the side where the stopped heat source is not present.

When it is determined that the user 30 is not looking aside (NO) in step S77, in step S75, the CPU 21 turns off the notification to the user 30 and moves the process to step S15.

As described above, when any stopped heat source is present and the stopped heat source is relatively approaching the user 30 as the user 30 moves, the motion sensor 13R or 13L generates an output signal. Then, the CPU 21 detects that the third party has approached the user 30. The mobile terminal 2 according to a seventh embodiment includes a notification controller that controls the notification unit to turn off the notification to the user 30 in such a state. The CPU 21 serves as the notification controller.

The CPU 21 can detect a state in which the stopped heat source is relatively approaching the user 30, based on the relationship between the change in the position of the user 30 by the movement of the user 30 and the change in the signal strength of the output signal of the motion sensor 13R or 13L.

When detecting a state in which the stopped heat source is relatively approaching the user 30, it is preferable that the CPU 21 determines whether it is assumed that the user 30 does not perceive the stopped heat source, based on the direction in which the user 30 is moving and the direction in which the head of the user 30 is directed. When it is assumed that the user 30 does not perceive the stopped heat source, the CPU 21 preferably controls the notification unit to not turn off the notification to the user 30.

In accordance with the mobile terminal 2 according to a seventh embodiment, in addition to the effect same as that of the mobile terminal 2 according to a first embodiment, it is also possible to prevent the user 30 from being notified of the approach of a third party when a stopped heat source is present and the heat source is relatively approaching the user 30 as the user 30 moves. In accordance with the mobile terminal 2 according to a seventh embodiment, when it is assumed that the stopped heat source is not perceived, the approach of the third party can be notified.

The present invention is not limited to first to seventh embodiments described above, and various modifications can be made without departing from the scope of the present invention. Second to seventh embodiments can be combined arbitrarily. First to seventh embodiments can also be configured with a computer program that causes the CPU to execute the processes according to each embodiment.

What is claimed is:

1. A mobile terminal comprising:
a communication circuit configured to communicate with a right earphone worn on a right ear of a user and a left earphone worn on a left ear of the user to receive a first output signal generated by a first motion sensor provided in the right earphone and a second output signal generated by a second motion sensor provided in the left earphone;
a detector configured to detect whether a third party has approached the user based on a difference value between the first output signal and the second output signal received by the communication circuit; and
a notification unit configured to notify the user that the third party has approached the user when the detector detects that the third party has approached the user,
wherein, when no third party has approached the user, the detector multiplies the first output signal and the second output signal by a weighting coefficient such that the difference value between the first output signal and the second output signal is equal to or less than a first predetermined value.

2. The mobile terminal according to claim 1, wherein
the notification unit is the communication circuit, and
the communication circuit transmits a voice signal for notifying the user that the third party has approached, to at least one of the right earphone and the left earphone.

3. The mobile terminal according to claim 1, wherein the notification unit is any one of a speaker unit configured to generate a voice notifying the user that the third party has approached, a display configured to display characters or images notifying the user that the third party has approached, and a vibration unit configured to vibrate to notify the user that the third party has approached.

4. The mobile terminal according to claim 1, wherein, when it is determined that a plurality of third parties are present around the user, the detector turns off a notification by the notification unit.

5. The mobile terminal according to claim 4, wherein, when the first output signal or the second output signal exceeds a predetermined value, the detector determines that a plurality of third parties are present around the user and turns off the notification by the notification unit.

6. The mobile terminal according to claim 4, wherein
the right earphone, the left earphone, or the mobile terminal includes a microphone, and
when a voice signal picked up by the microphone exceeds a predetermined volume, the detector determines that a plurality of third parties are present around the user and turns off the notification by the notification unit.

7. The mobile terminal according to claim 1, wherein
the detector is configured to:
determine whether the user is wearing the right earphone and the left earphone on the right ear and the left ear; and
instruct the right earphone and the left earphone to turn off the first and second motion sensors at least intermittently when it is determined that the user is not wearing the right earphone or the left earphone.

8. The mobile terminal according to claim 7, wherein
the right earphone and the left earphone include a proximity sensor,
the communication circuit receives an output signal of the proximity sensor, and the detector is configured to:
determine whether the user is wearing the right earphone and the left earphone based on the output signal of the proximity sensor received by the communication circuit; and
instruct the right earphone and the left earphone to turn off the first and second motion sensors when it is determined that the user is not wearing the right earphone or the left earphone.

9. The mobile terminal according to claim 1, further comprising:
a current position acquisition unit configured to acquire a current position; and
a storage unit configured to store a designated area indicating a place for notifying the user of an approach of a third party, wherein
the notification unit turns off a notification to the user when the current position is not within the designated area.

10. The mobile terminal according to claim 9, further comprising:
a current time acquisition unit configured to acquire the current time; and
a storage unit configured to store a designated time indicating a time for notifying the user of an approach of a third party, wherein
the notification unit turns off a notification to the user when the current time is not the designated time.

11. The mobile terminal according to claim 1, further comprising:
a movement speed acquisition unit configured to acquire a movement speed of the user, wherein
the notification unit turns off a notification to the user when the movement speed of the user acquired by the movement speed acquisition unit is equal to or higher than a predetermined speed.

12. The mobile terminal according to claim 11, wherein the right earphone, the left earphone, or the mobile terminal includes an acceleration sensor, and
the movement speed acquisition unit obtains the movement speed of the user based on an acceleration acquired by the acceleration sensor.

13. The mobile terminal according to claim 1, further comprising:
a motion acquisition unit configured to acquire a motion of a head of the user, wherein,
after the notification unit notifies the user that the third party has approached, when the motion acquisition unit acquires a motion of the head of the user which is assumed to be confirming of the third party, the notification unit turns off a notification to the user.

14. The mobile terminal according to claim 13, wherein the right earphone and the left earphone include an acceleration sensor, and
the motion acquisition unit acquires the motion of the head of the user based on an output signal of the acceleration sensor.

15. The mobile terminal according to claim 13, wherein the right earphone and the left earphone include an acceleration sensor and a geomagnetic sensor, and
the motion acquisition unit acquires the motion of the head of the user based on an output signal of the acceleration sensor and an output signal of the geomagnetic sensor.

16. The mobile terminal according to claim 1, further comprising a notification controller configured to control the notification unit to turn off a notification to the user, when any stopped heat source is present and the stopped heat source is relatively approaching the user as the user moves and the first motion sensor generates the first output signal or the second motion sensor generates the second output signal such that the detector detects that the third party has approached the user.

17. The mobile terminal according to claim 16, wherein the notification controller detects a state in which the stopped heat source is relatively approaching the user based on a relationship between a change in a position of the user by a movement of the user and a change in a signal strength of the first or second output signal.

18. A mobile terminal comprising:
a communication circuit configured to communicate with a right earphone worn on a right ear of a user and a left earphone worn on a left ear of the user to receive a first output signal generated by a first motion sensor provided in the right earphone and a second output signal generated by a second motion sensor provided in the left earphone;
a detector configured to detect whether a third party has approached the user based on a difference value between the first output signal and the second output signal received by the communication circuit; and
a notification unit configured to notify the user that the third party has approached the user when the detector detects that the third party has approached the user,
wherein the detector is configured to:
determine whether the user is wearing the right earphone and the left earphone based on whether the first and second output signals are equal to or less than a third predetermined value which is smaller than the first and second output signals output when the user is wearing the right earphone and the left earphone and there is no third party around the user; and
instruct the right earphone and the left earphone to turn off the first and second motion sensors at predetermined time intervals when it is determined that the user is not wearing the right earphone or the left earphone.

19. A mobile terminal comprising:
a communication circuit configured to communicate with a right earphone worn on a right ear of a user and a left earphone worn on a left ear of the user to receive a first output signal generated by a first motion sensor provided in the right earphone and a second output signal generated by a second motion sensor provided in the left earphone;
a detector configured to detect whether a third party has approached the user based on a difference value between the first output signal and the second output signal received by the communication circuit;
a notification unit configured to notify the user that the third party has approached the user when the detector detects that the third party has approached the user, and
a notification controller configured to control the notification unit to turn off a notification to the user, when any stopped heat source is present and the stopped heat source is relatively approaching the user as the user moves and the first motion sensor generates the first output signal or the second motion sensor generates the second output signal such that the detector detects that the third party has approached the user,
wherein, when detecting a state in which the stopped heat source is relatively approaching the user, the notification controller determines whether it is assumed that the user does not perceive the stopped heat source, based on a direction in which the user is moving and an orientation of the head of the user, and controls the notification unit not to turn off the notification to the user when it is assumed that the user does not perceive the stopped heat source.

\* \* \* \* \*